(12) United States Patent  (10) Patent No.: US 8,662,461 B2
Mori  (45) Date of Patent:  Mar. 4, 2014

(54) CLAMPS FOR MUSICAL INSTRUMENT STAND

(75) Inventor: Yoshiaki Mori, Hamamatsu (JP)

(73) Assignee: Roland Corporation, Hamamatsu (JP)

( * ) Notice: Subject to any disclaimer, the term of this patent is extended or adjusted under 35 U.S.C. 154(b) by 168 days.

(21) Appl. No.: 12/829,322

(22) Filed: Jul. 1, 2010

(65) Prior Publication Data

US 2011/0049868 A1  Mar. 3, 2011

(30) Foreign Application Priority Data

Aug. 31, 2009  (JP) .................................. 2009-200977

(51) Int. Cl.
  *A47B 96/06*  (2006.01)
(52) U.S. Cl.
  USPC .................... 248/230.4; 248/229.13; 403/104
(58) Field of Classification Search
  USPC .............. 248/230.4, 229.13, 229.14, 229.23, 248/229.24, 227.4, 230.1, 230.5, 227.3, 248/231.51, 231.61; 84/421; 403/104, 403/109.5, 377
  See application file for complete search history.

(56) References Cited

U.S. PATENT DOCUMENTS

| | | | | |
|---|---|---|---|---|
| 1,706,801 | A | * | 3/1929 | Merrill ........................ 403/385 |
| 2,355,742 | A | * | 8/1944 | Morehouse .................. 248/68.1 |
| 3,203,653 | A | * | 8/1965 | Hall ............................. 248/62 |
| 4,111,575 | A | * | 9/1978 | Hoshino ....................... 403/104 |
| 4,430,017 | A | * | 2/1984 | Stefancich ................... 403/104 |
| 4,744,535 | A | * | 5/1988 | Patenaude .................... 248/74.1 |
| 4,784,363 | A | * | 11/1988 | Brown et al. ................. 248/610 |

(Continued)

FOREIGN PATENT DOCUMENTS

| | | |
|---|---|---|
| GB | 2119848 A * | 11/1983 |
| JP | SHO-57-058646 | 9/1980 |

(Continued)

OTHER PUBLICATIONS

English Machine Translation of JP3014483 dated May 31, 1995.
TAMA Power Tower System, Drums and Hardware, Mar. 2006, product catalog 2006-2007, vol. 25, p. 46.
Yamaha System Drums, product catalog, Jul. 2008, p. 42.

(Continued)

*Primary Examiner* — Anita M King
(74) *Attorney, Agent, or Firm* — David W. Victor; Konrad Raynes Davda & Victor LLP

(57) ABSTRACT

A clamp for a musical instrument stand is equipped with a pipe retaining section having a metal base section formed with an abutting surface having a cylindrical inner peripheral surface, and a metal fastening section formed with a fastening surface having a cylindrical inner peripheral surface that is opposite to the abutting surface of the base section, wherein the abutting surface and the fastening surface hold an outer peripheral surface of a pipe from one side and another side to retain the pipe, and the clamp comprises a pipe sleeve in a semi-cylindrical shape that is made of a resin material, and has an outer peripheral surface to be abutted to the abutting surface or the fastening surface so as to be mounted on the abutting surface or the fastening surface; and a recessed section that is provided in a concave shape in a portion of at least one surface among an outer peripheral surface of the pipe sleeve, the abutting surface and the fastening surface, wherein a predetermined space surrounded by the recessed section and a surface opposite to the recessed section is formed between the abutting surface and the outer peripheral surface of the pipe sleeve opposite to the abutting surface or between the fastening surface and the outer peripheral surface of the pipe sleeve opposite to the fastening surface.

23 Claims, 14 Drawing Sheets

(56) References Cited

U.S. PATENT DOCUMENTS

| | | | |
|---|---|---|---|
| 5,257,768 A * | 11/1993 | Juenemann et al. | 248/604 |
| 5,645,253 A * | 7/1997 | Hoshino | 248/181.1 |
| 5,929,355 A | 7/1999 | Adinolfi | |
| 5,941,653 A * | 8/1999 | Cipriani | 403/344 |
| 6,096,956 A * | 8/2000 | Hoshino | 84/421 |
| 6,717,505 B1 * | 4/2004 | Bruchmann | 337/194 |
| 6,892,990 B2 * | 5/2005 | Pisczak | 248/74.4 |
| D576,870 S | 9/2008 | Eason et al. | |
| D613,092 S | 4/2010 | Eason et al. | |
| 7,784,953 B2 | 8/2010 | Rumsey et al. | |
| 8,106,278 B2 * | 1/2012 | Eason | 84/421 |
| 2004/0195486 A1 | 10/2004 | Rumsey et al. | |
| 2008/0163739 A1 | 7/2008 | Mori | |
| 2008/0229901 A1 | 9/2008 | Eason et al. | |
| 2009/0250584 A1 | 10/2009 | Hsieh | |
| 2011/0049867 A1 * | 3/2011 | Mori | 285/188 |
| 2011/0239844 A1 | 10/2011 | Eason | |

FOREIGN PATENT DOCUMENTS

| | | |
|---|---|---|
| JP | SHO 61-114110 | 7/1986 |
| JP | 3014483 | 5/1995 |
| JP | 2007525627 | 9/2007 |

OTHER PUBLICATIONS

U.S. Application entitled "Pipe Holder", filed Jun. 30, 2010, by inventor Y. Mori.

Final Office Action dated Aug. 20, 2013, pp. 1-17, for U.S. Appl. No. 12/829,313 by inventor Y. Mori.

Office Action dated Mar. 14, 2013, pp. 1-13, for U.S. Appl. No. 12/829,313 by inventor Y. Mori.

Response dated Jun. 12, 2013, pp. 1-14, to Office Action dated Mar. 14, 2013, pp. 1-13, for U.S. Appl. No. 12/829,313 by inventor Y. Mori.

JP Office Action dated Oct. 13, 2013 for Application No. 2009-200976.

Translation of JP Office Action dated Oct. 13, 2013 for Application No. 2009-200976.

Partial translation of SHO 61-114110 Jul. 18, 1986.

Partial translation of SHO-57-058646 Sep. 25, 1980.

Response dated Oct. 18, 2013, pp. 15, to Final Office Action dated Aug. 20, 2013, pp. 1-17, for U.S. Appl. No. 12/829,313 by inventor Y. Mori.

US20110239844 is an English language counterpart of JP2007525627.

Notice of Allowance dated Nov. 1, 2013 in U.S. Appl. No. 12/829,313 by inventor Y. Mori.

* cited by examiner

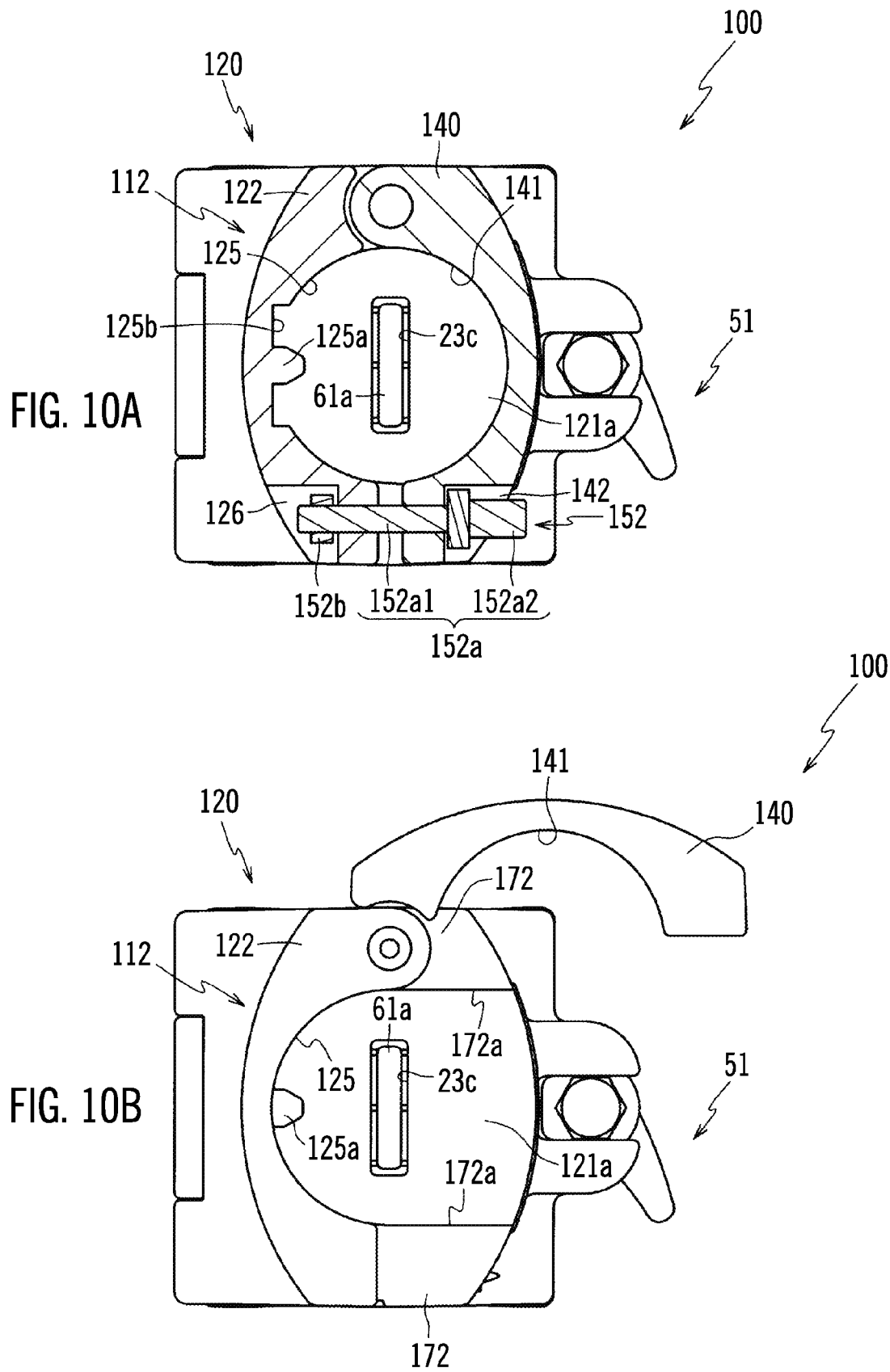

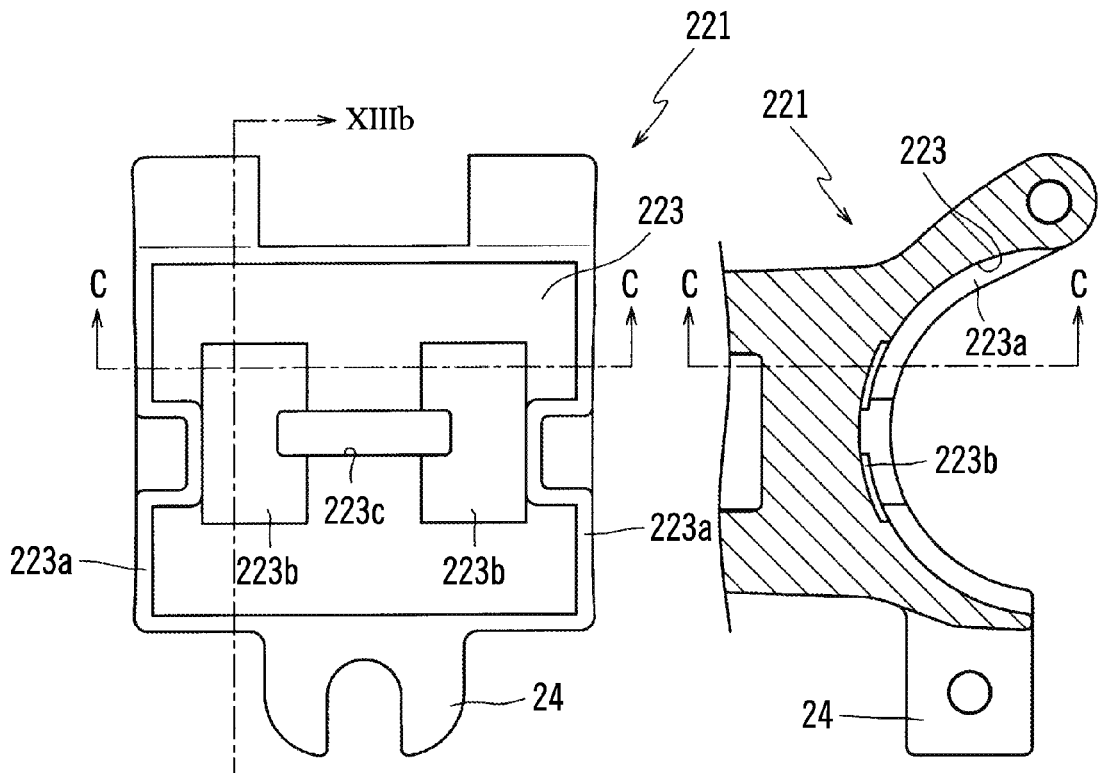
FIG. 13A
FIG. 13B
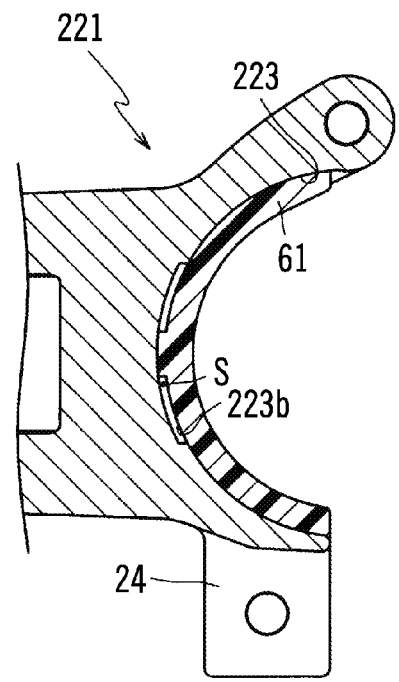
FIG. 13C

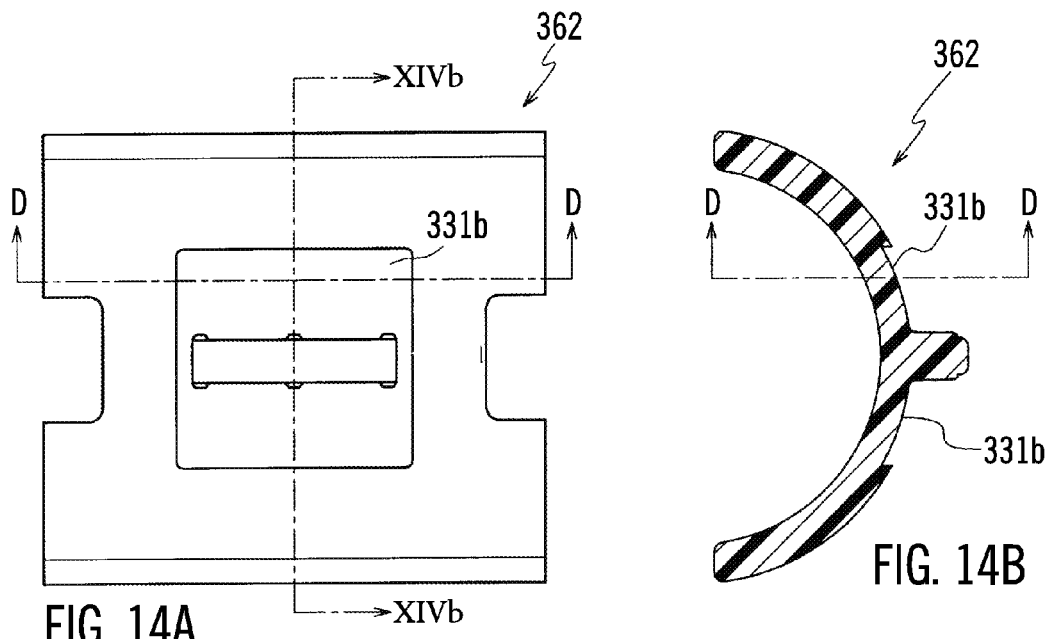
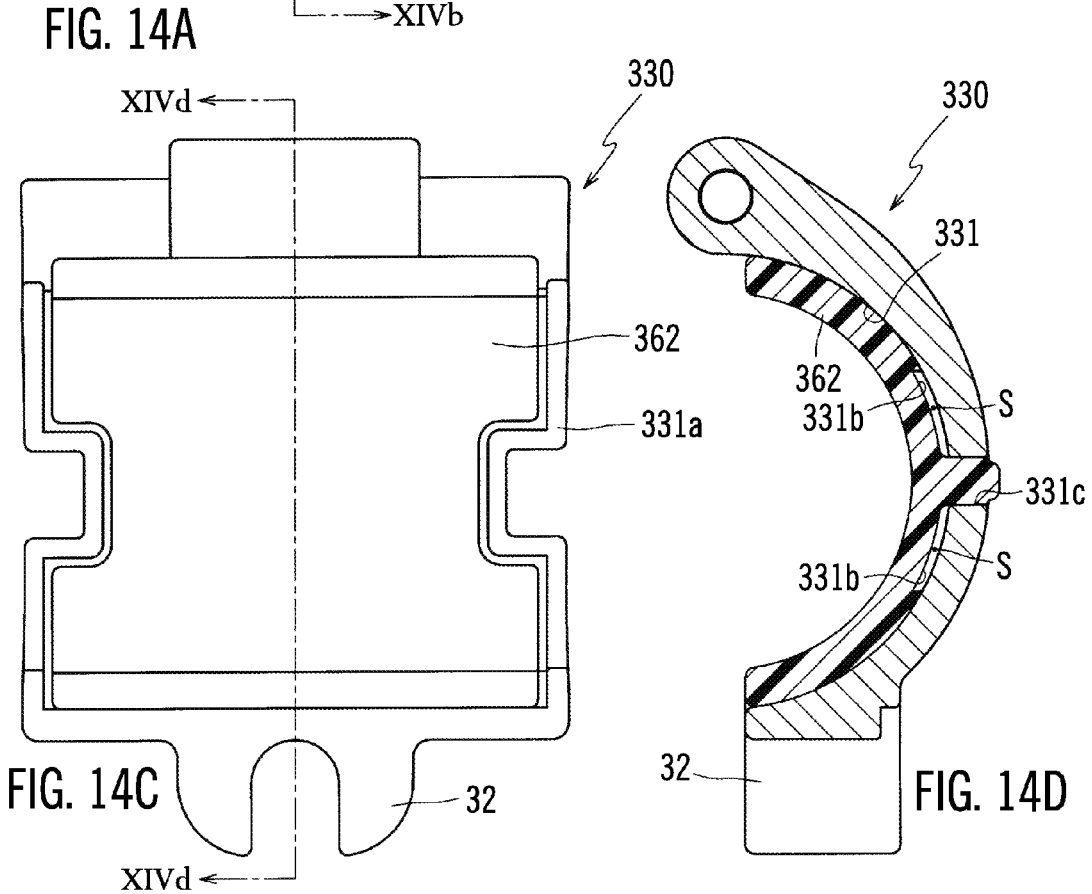

CLAMPS FOR MUSICAL INSTRUMENT STAND

CROSS-REFERENCE TO RELATED FOREIGN APPLICATION

This application is a non-provisional application that claims priority benefits 5 under Title 35, United States Code, Section 119(a)-(d) from Japanese Patent Application entitled "CLAMPS FOR MUSICAL INSTRUMENT STAND" by Yoshiaki MORI, having Japanese Patent Application Serial No. 2009-200977, filed on Aug. 31, 2009, which Japanese Patent Application is incorporated herein by reference in its entirety.

BACKGROUND OF THE INVENTION

1. Field of the Invention

The present invention relates to clamps for musical instrument stands, including clamps for musical instrument stands which can reliably fix both pipes in a linear shape and pipes in a curved shape. Furthermore, the invention particularly relates to clamps for musical instrument stands by which positional adjustment can be smoothly performed.

2. Description of the Related Art

Musical instruments such as drums and cymbals played by performers are attached to musical instrument stands, and are arranged at positions according to performer's preference. A musical instrument stand is structured through connecting a plurality of pipes. By changing positions of coupling members connecting these plural pipes, the height of the musical instrument, its angle and its distance from the performer can be adjusted.

As the coupling member, for example, a pipe holder (a clamp for a musical instrument stand) described in Japanese laid-open utility model patent application HEI 05-38691 is known. The pipe holder has a pair of pipe holding blocks (a base section and a fastening section) composed of cast metal. Further, the pipe holder has a pipe retaining section. The pipe retaining section is formed with a semi-circular concave recessed section (recessed section) formed in each of opposing surfaces (an abutting surface and a fastening surface) of the pair of pipe holding blocks in a central area thereof.

However, the pipe holders described above are made of cast metal. Accordingly, the surface that comes in contact with a pipe cannot be deformed according to the shape of the pipe. Therefore, if a curved pipe is retained by the pipe holder that is formed for retaining a linear pipe, the contact surface between the pipe holder and the pipe becomes small such that the pressure generated for holding and fixing the pipe is not sufficiently transmitted to the pipe. This causes a problem of insufficient pipe retaining force. Further, when changing the arranged position of a musical instrument, the coupled position of a musical instrument support arm that supports the musical instrument and also is fixed to a pipe holder is adjusted. In this instance, when the pipe holder is slidably moved along the pipe in a state in which the pipe is loosely inserted in the pipe holder, a large frictional force is generated at the contact surface between the pipe holder and the pipe. This causes a problem in that, when the pipe holder is slidably moved, a greater force is required, substantial noise is generated and the pipe may be damaged.

SUMMARY

Described embodiments provide a clamp for a musical instrument stand equipped with a pipe retaining section having a metal base section formed with an abutting surface having a cylindrical inner peripheral surface, and a metal fastening section formed with a fastening surface having a cylindrical inner peripheral surface that is opposite to the abutting surface of the base section, wherein the abutting surface and the fastening surface hold an outer peripheral surface of a pipe from one side and another side to retain the pipe, and the clamp comprises a pipe sleeve in a semi-cylindrical shape that is made of a resin material, and has an outer peripheral surface to be abutted to the abutting surface or the fastening surface so as to be mounted on the abutting surface or the fastening surface; and a recessed section that is provided in a concave shape in a portion of at least one surface among an outer peripheral surface of the pipe sleeve, the abutting surface and the fastening surface, wherein a predetermined space surrounded by the recessed section and a surface opposite to the recessed section is formed between the abutting surface and the outer peripheral surface of the pipe sleeve opposite to the abutting surface or between the fastening surface and the outer peripheral surface of the pipe sleeve opposite to the fastening surface.

In a further embodiment, the clamp comprises protruded walls that are located at openings on both sides of the pipe retaining section and protrude on the abutting surface and the fastening surface, wherein the protruded walls are formed with tips being lower than an inner peripheral surface of the pipe sleeve.

In a further embodiment, the outer peripheral surface of the pipe sleeve, the abutting surface or the fastening surface, which has the recessed section provided in a concave shape therein, is in contact with a mutually opposing one of the outer peripheral surface of the pipe sleeve, the abutting surface and the fastening surface at one side and another side interposing the recessed section in a direction along a line connecting between a center of the opening of the one end side and a center of the opening of the other end side of the pipe retaining section.

In a further embodiment, the outer peripheral surface of the pipe sleeve, the abutting surface or the fastening surface, which has the recessed section provided in a concave shape therein, is in contact in part with a mutually opposing one of the outer peripheral surface of the pipe sleeve, the abutting surface and the fastening surface as viewed in a cross section that is perpendicular to a line connecting between a center of the opening of the one end side and a center of the opening of the other end side of the pipe retaining section and includes the recessed section.

In a further embodiment, the recessed section is formed in a constant depth from the outer peripheral surface of the pipe sleeve, the abutting surface or the fastening surface, which has the recessed section provided in a concave shape therein.

In a further embodiment, the recessed sections are formed at two places in one of the abutting surface and the outer peripheral surface of the pipe sleeve that is opposite to the abutting surface, and in one of the fastening surface and the outer peripheral surface of the pipe sleeve that is opposite to the fastening surface.

In a further embodiment, the recessed section is formed in one or each of the abutting surface and the fastening surface, and the pipe sleeve is formed with an outer peripheral surface in a flat arcuate protruded surface shape.

In a further embodiment, the base section has a bolt member for tightening the fastening section to the base section, wherein the recessed section opens in the same direction as or in a direction opposite to an axial direction of the bolt member at the time of tightening and fixing the fastening section to the base section.

In a further embodiment, the pipe sleeve is made of a resin material having a Young's modulus of 0.5 GPa or higher but less than 10 GPa.

BRIEF DESCRIPTION OF THE DRAWINGS

FIG. 6 (c) is a rear side view of the first part in a state in which a pipe sleeve is mounted. FIG. 6 (d) is a cross-sectional view of the first part taken along a line VId-VId in FIG. 6 (c).

FIG. 9 (b) is a cross-sectional view of the pipe holder taken along a line IXb-IXb in FIG. 9 (a) in a state in which a vertical upstanding pipe is retained.

FIG. 10 (a) is a cross-sectional view of the pipe holder taken along a line Xa-Xa in FIG. 9 (a). FIG. 10 (b) is a side view of the pipe holder in a state in which the second part is opened.

FIG. 11 (b) is a cross-sectional view of the cable sleeve taken along a line XIb-XIb in FIG. 11 (a). FIG. 11 (c) is a cross-sectional view of the cable sleeve taken along a line XIc-XIc in FIG. 11 (a). FIG. 11 (d) is a front view of the cable sleeve in a state in which the slit cut is opened wider.

FIG. 12 (b) is a front view of the container pipe and the pipe holder in a state in which the second part is opened.

FIG. 13 (a) is a rear side view of a first fixing section in accordance with a third embodiment. FIG. 13 (b) is a cross-sectional view of the first fixing section taken along a line XIIIb-XIIIb in FIG. 13 (a). FIG. 13 (c) is a cross-sectional view of the first fixing section when the pipe sleeve is mounted, and is a view corresponding to FIG. 13 (b).

FIG. 14 (a) is a rear side view of a pipe sleeve in accordance with a fourth embodiment. FIG. 14 (b) is a cross-sectional view of the pipe sleeve taken along a line XIVb-XIVb in FIG. 14 (a). FIG. 14 (c) is a rear side view of the first part in a state with the pipe sleeve mounted. FIG. 14 (d) is a cross-sectional view of the first part taken along a line XIVd-XIVd in FIG. 14 (c).

DETAILED DESCRIPTION

Figure 1:
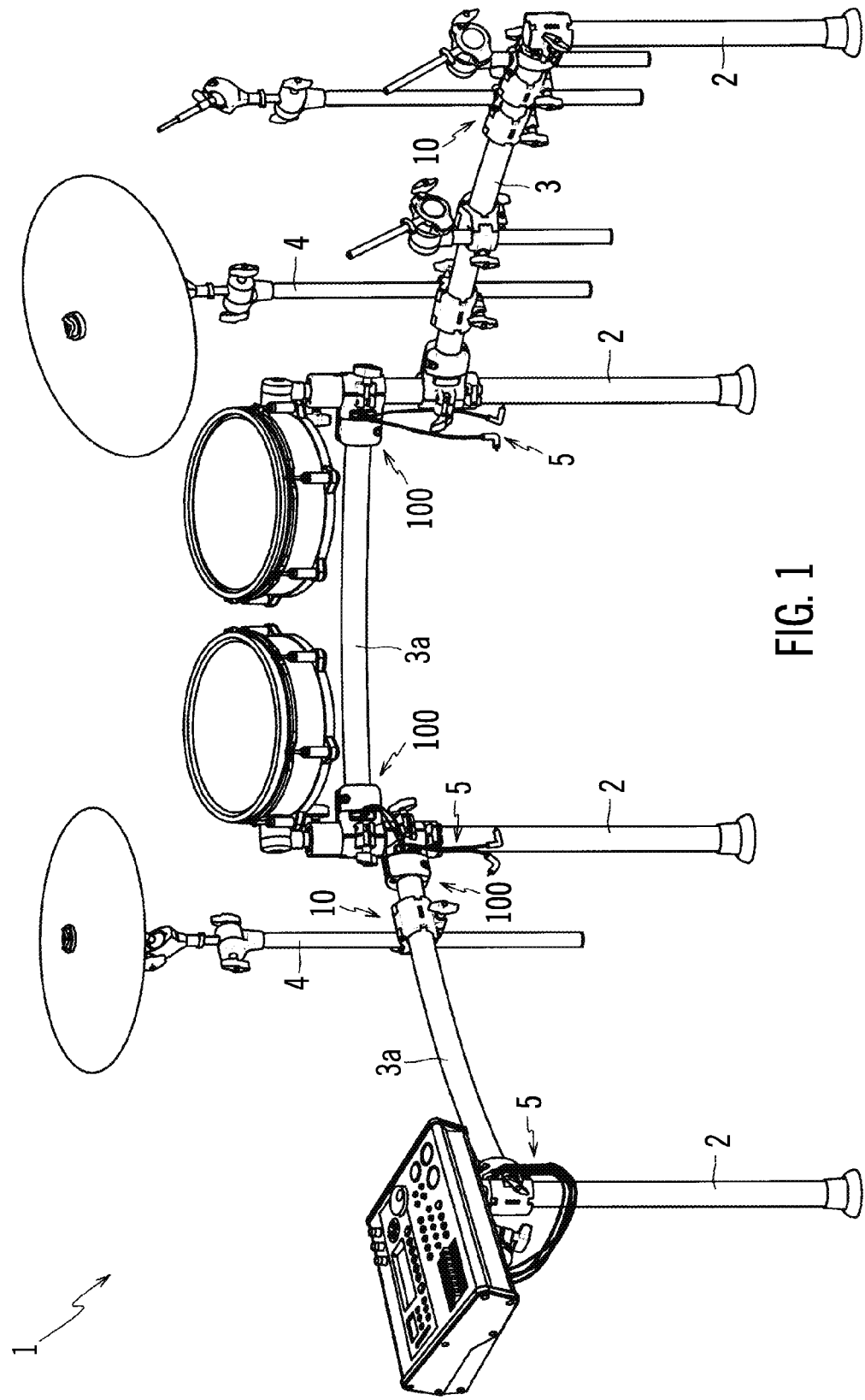
FIG. 1 is a perspective view of a musical instrument stand using clamps in accordance with a first embodiment of the invention and pipe holders in accordance with a second embodiment of the invention.

Described embodiments provide clamps for musical instrument stands which can reliably fix both pipes in a linear shape and pipes in a curved shape. Moreover, it is also an object of the embodiments to provide clamps for musical instrument stands by which positional adjustment can be smoothly performed.

The clamp for a musical instrument stand in certain embodiments has the pipe sleeve and the recessed section. The pipe sleeve is made of a resin material, and is formed in a semi-cylindrical shape. Further, the outer peripheral surface of the pipe sleeve is abutted against the abutting surface or the fastening surface, thereby being mounted on the abutting surface or the fastening surface. The recessed section is provided in a recessed shape in at least one the outer peripheral surface of the pipe sleeve, the abutting surface and the fastening surface in a portion thereof. Further, a predetermined space surrounded by the recessed section and a surface opposite to the recessed section is formed between the abutting surface and the outer peripheral surface of the pipe sleeve opposite to the abutting surface or between the fastening surface and the outer peripheral surface of the pipe sleeve opposite to the fastening surface. By this, when retaining a pipe in a linear shape, the inner peripheral surface of the pipe sleeve in a semi-cylindrical shape is contacted with the outer peripheral surface of the pipe, whereby a wider contact area with the outer peripheral surface of the pipe can be secured. On the other hand, when retaining a pipe in a curved shape, a portion of the outer peripheral surface of the pipe sleeve opposite to the recessed section is pushed by an outwardly bent portion of the pipe into the space. By this, the pipe sleeve can be deformed to conform to the shape of the outwardly bent portion of the pipe. Therefore, a wide contact area can be secured between the pipe sleeve and the pipe. Accordingly, for a pipe in a linear shape and a pipe in a curved shape, a wide contact area can be secured between the pipe sleeve and the pipe. Consequently, the pressure generated when the pipe is held and fixed by the pipe retaining section can be securely transmitted to the pipe, whereby the pipe can be reliably fixed.

Also, the pipe is retained while keeping the pipe sleeve made of a resin material in contact with the pipe. This makes it possible to reduce the frictional force that is generated at the time of slidably moving the clamp along the pipe in a state in which the pipe is loosely inserted in the clamp. Therefore, the positional adjustment of the clamp can be smoothly performed.

More specifically, in a structure in which a pipe made of metal is retained in a state in which the pipe is in contact with an abutting surface or a fastening surface made of metal, if a clamp is slidably moved along the pipe in a state in which the pipe is loosely inserted in the clamp, a large frictional force is generated at the contact surface between the pipe and the clamp. Therefore, a greater force is required to be applied for the slidable movements, and the slidable movements are accompanied by noise generation. Furthermore, the pipe may be damaged by the contact with the abutting surface or the fastening surface. In contrast, in accordance with the described embodiments, the pipe sleeve made of a resin material is provided between the pipe and the abutting surface and the fastening surface. Accordingly, the frictional force that is generated when the clamp is slidably moved along the pipe can be reduced. Therefore, the clamp can be smoothly slidably moved, and generation of noise and damage to the pipe which may be caused by slidable movements of the clamp can be suppressed.

In certain embodiments, the clamp for a musical instrument stand has protruded walls that are located at openings on both sides of the pipe retaining section and protrude on the abutting surface and the fastening surface. Therefore, by mounting the pipe sleeve between the pair of protruded walls, movements of the pipe sleeve in the longitudinal direction of the pipe that is retained by the pipe retaining section can be restricted. Accordingly, when the clamp is slidably moved along the pipe, the pipe sleeve mounted on the abutting surface or the fastening surface can be prevented from slipping off the opening of the pipe retaining section.

Further, the tips of the protruded walls are formed to be lower than the inner peripheral surface of the pipe sleeve. By this, when the pipe is held and fixed by the pipe retaining section, the inner peripheral surface of the pipe sleeve is abutted against the outer peripheral surface of the pipe, whereby the tips of the protruded walls and the pipe can be prevented from contacting each other. Therefore, this makes it possible to avoid deformation or damage to the pipe that may be caused by the tips of the protruded walls if they were pressed against the pipe by the pressure generated when the pipe is held and fixed by the pipe retaining section.

In certain embodiments, the outer peripheral surface of the pipe sleeve, the abutting surface or the fastening surface, which has the recessed section provided in a concave shape therein, is in contact with a mutually opposing one of the outer peripheral surface of the pipe sleeve, the abutting surface and the fastening surface at one side and another side interposing the recessed section in a direction along a line connecting between a center of the opening of the one end side and a center of the opening of the other end side of the pipe retaining section. By this, when a pipe in a curved shape is fixed, the pipe sleeve is deformed according to the shape of the outwardly bent portion of the pipe, and the pressure generated at the time of holding and fixing the pipe by the pipe retaining section can be securely transmitted to the pipe through the pipe sleeve. This allows the pipe to be securely fixed.

More specifically, with a structure in which the recessed section is formed at one end or at each of two ends in a direction along a line connecting between a center of the opening of the one end side and a center of the opening of the other end side of the pipe retaining section, if a curved pipe is retained, only one surface between the outer peripheral surface of the pipe sleeve and the abutting surface or the fastening surface is available to abut. In contrast, in accordance with the described embodiments, the outer peripheral surface of the pipe sleeve is in mutual contact with the abutting surface or the fastening surface in two surfaces at one side and another side interposing the recessed section in a direction along a line connecting between the center of the opening of the one end side and the center of the opening of the other end side of the pipe retaining section. Accordingly, this allows the pressure generated at the time of holding and fixing the pipe to be more securely transmitted to the pipe through the pipe sleeve.

In further embodiments, the outer peripheral surface of the pipe sleeve, the abutting surface or the fastening surface, which has the recessed section provided in a concave shape therein, is in contact in part with a mutually opposing one of the outer peripheral surface of the pipe sleeve, the abutting surface and the fastening surface, as viewed in a cross section that is perpendicular to a line connecting between the center of the opening of the one end side and the center of the opening of the other end side of the pipe retaining section and includes the recessed section. Accordingly, in particular, when retaining a pipe in a linear shape, a wider contact area can be secured between the outer peripheral surface of the pipe sleeve and the abutting surface or the fastening surface.

In other words, the recessed section is formed in the pipe sleeve, the abutting surface or the fastening surface in a portion in a circumferential direction thereof. By this, compared to a structure in which the recessed section is formed in the pipe sleeve, the abutting surface or the fastening surface entirely in a circumferential direction thereof, a wider contact area can be secured between the outer peripheral surface of the pipe sleeve and the abutting surface or the fastening surface. Therefore the pressure generated at the time of holding and fixing the pipe can be more securely transmitted to the pipe through the pipe sleeve. In other words, the pipe can be more securely fixed.

In further embodiments, the recessed section is formed in a constant depth from the outer peripheral surface of the pipe sleeve, the abutting surface or the fastening surface, which has the recessed section provided in a concave shape therein. Furthermore, the recessed section has a cross section that is in a generally right-angled channel shape along a line connecting between the center of the opening of the one end side and the center of the opening of the other end side of the pipe retaining section. By this, a pipe in a curved shape having a radius (R) in a predetermined range can be more securely retained. More specifically, when the recessed section is provided in a concave shape in an arc shape in a cross section along a line connecting between the center of the opening of the one end side and the center of the opening of the other end side of the pipe retaining section, and if the R of the recessed section formed in an arc shape does not match with the R of the pipe to be retained, a sufficient contact area cannot be secured between the pipe sleeve and the pipe. In contrast, in accordance with described embodiments, the recessed section is provided in a generally right angled channel shape in a cross section along a line connecting between the center of the opening of the one end side and the center of the opening of the other end side of the pipe retaining section. For this reason, the space that is formed by the recessed section and the surface opposite to the recessed section can secure a greater volume. Accordingly, the pipe in a curved configuration whose radius R is set within a predetermined range more can be reliably retained.

In further embodiments, the recessed sections are formed at two places in one of the abutting surface and the outer peripheral surface of the pipe sleeve that is opposite to the abutting surface, and in one of the fastening surface and the outer peripheral surface of the pipe sleeve that is opposite to the fastening surface. By this, it is possible to select between two methods when retaining a curved shaped pipe, the method of disposing the outwardly bent portion of the pipe to orient in a direction in which one of the recessed sections is located, and the method of disposing the outwardly bent portion of the pipe to orient in a direction in which the other recessed section is located. Accordingly, the orientation of the clamp at the time of retaining the pipe can be given a certain degree of freedom.

In further embodiments, the recessed section is formed in one or each of the abutting surface and the fastening surface. Moreover the pipe sleeve is formed with an outer peripheral surface in a flat arcuate protruded surface shape. Accordingly, a thickness of the pipe sleeve can be secured. By this, the durability of the pipe sleeve can be improved. More specifically, as the pipe sleeve is made of a resin material that has a lower rigidity than that of the base section or the fastening section, the pipe sleeve would more likely be damaged after repetitive uses. Accordingly, by forming the recessed section in the abutting surface or the fastening surface, the thickness of the pipe sleeve is sufficiently secured while forming a space that allows the pipe sleeve to deform, whereby the durability of the pipe sleeve can be improved.

In further embodiments, the clamp for the musical instrument may be equipped with a bolt member for tightening the fastening section to the base section. Furthermore, the recessed section opens in the same direction as or in a direction opposite to an axial direction of the bolt member at the time of tightening and fixing the fastening section to the base section. Accordingly, when retaining a pipe in a curved shape, by disposing the outwardly bent portion of the pipe to be oriented in a direction where the recessed section is located, the pipe sleeve would readily be deformed according to the bent configuration of the outwardly bent portion of the pipe. Therefore the pipe can be more securely fixed.

In further embodiments, the pipe sleeve is made of a resin material having a Young's modulus of less than 10 GPa. By this, the pipe can be prevented from being damaged by the pipe sleeve when the pipe is clamped and fixed by the clamp. Also, at the time of holding and fixing the pipe by the clamp, the pipe sleeve can be more readily deformed, conforming to the shape of the pipe. Because of this, a greater contact area can be secured between the inner peripheral surface of the pipe sleeve and the pipe.

Furthermore, by setting the Young's modulus greater than 0.5 GPa, absorption of the pressure generated at the time of holding and fixing the pipe by the pipe sleeve can be suppressed, and the pressure can be reliably transmitted to the pipe. Also, compared to rubber or the like having a small Young's modulus, the deformation resisting property to compression can be made higher. For this reason, when fixing the pipe with the clamp, and even if the pipe sleeve is repeatedly continuously compressed between the pipe and the abutting surface or the fastening surface, permanent compression deformation of the pipe sleeve can be suppressed. Furthermore, the pipe sleeves can have improved durability.

Hereunder, preferred embodiments will be described with reference to the accompanying drawings. FIG. 1 is a perspective view of a musical instrument stand 1 using clamps 10 in accordance with a first embodiment and pipe holders 100 in accordance with a second embodiment. First, referring to FIG. 1, an outline of the structure of the musical instrument stand 1.

As shown in FIG. 1, the musical instrument stand 1 is structured with members for attaching musical instruments such as electronic drums, electronic cymbals and the like to be played by performers. The musical instrument stand 1 is primarily equipped with a plurality of upstanding pipes 2, a plurality of curved pipes 3, a plurality of support pipes 4, a plurality of clamps 10, and a plurality of pipe holders 100. The upstanding pipes 2 stand upright on the ground surface. The curved pipes 3 are disposed generally in parallel with the ground surface. The support pipes 4 support the musical instruments. The clamps 10 couple the curved pipes 3 and the support pipes 4. The pipe holders 100 couple the upstanding pipes 2 and the curved pipes 3.

The curved pipes 3 are tubular members that are hollow inside and curved in an arc shape. Some of the plural curved pipes 3 are used as container pipes 3a. Connector cables 5 having at least one ends connectable to the electronic musical instruments are stored inside the container pipes 3a.

Figure 2:
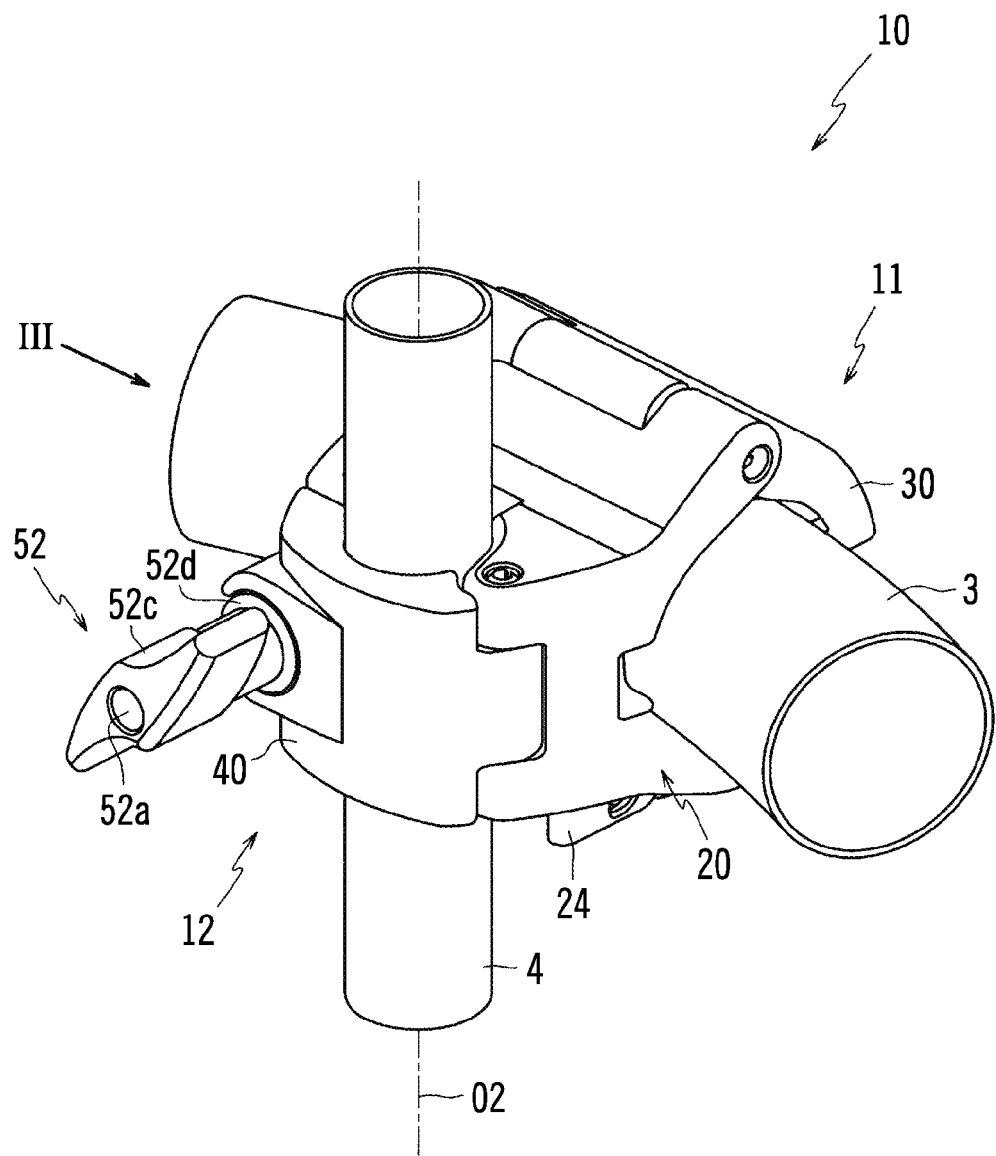
FIG. 2 is a perspective view of the clamp in a state in which a curved pipe and a support pipe are retained.
Figure 3:
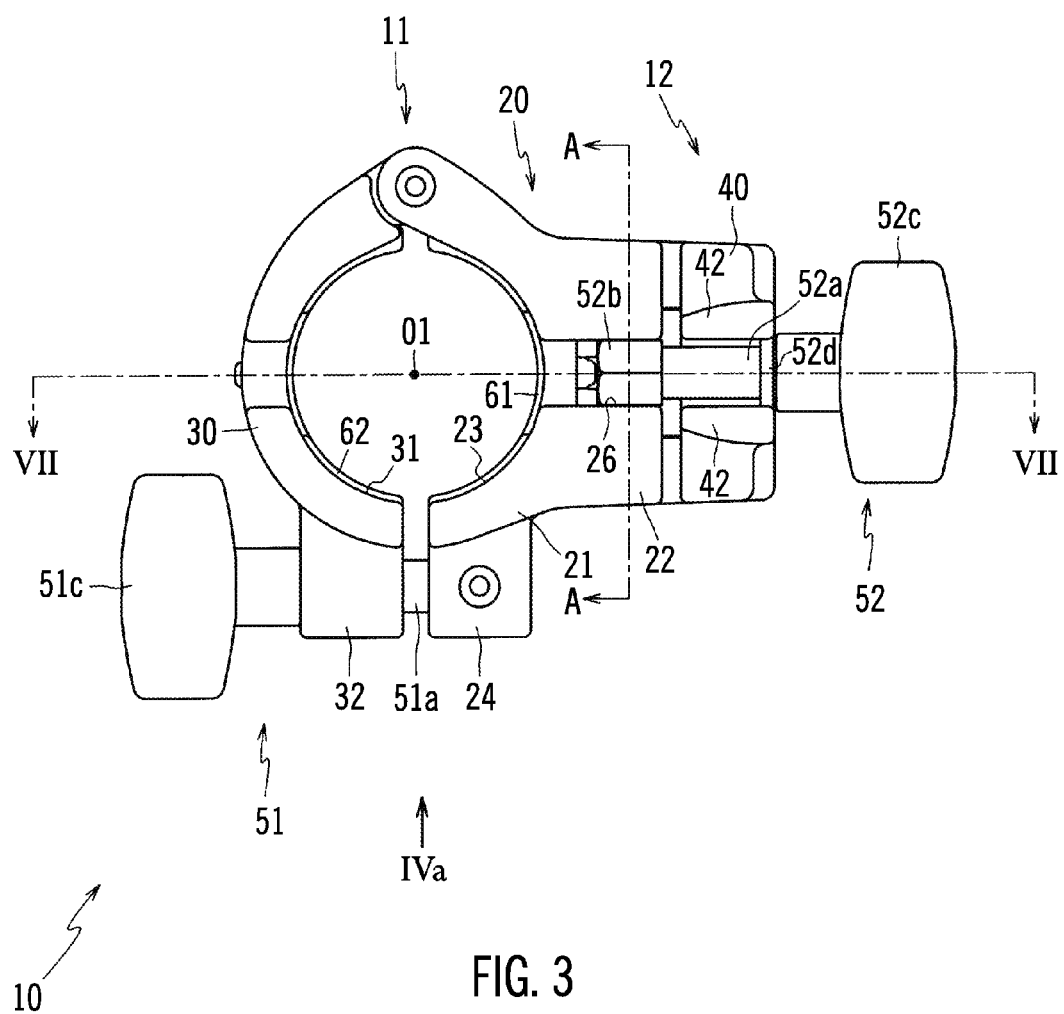
FIG. 3 is a side view of the clamp viewed in a direction of an arrow III in FIG. 2.
Figure 4A:
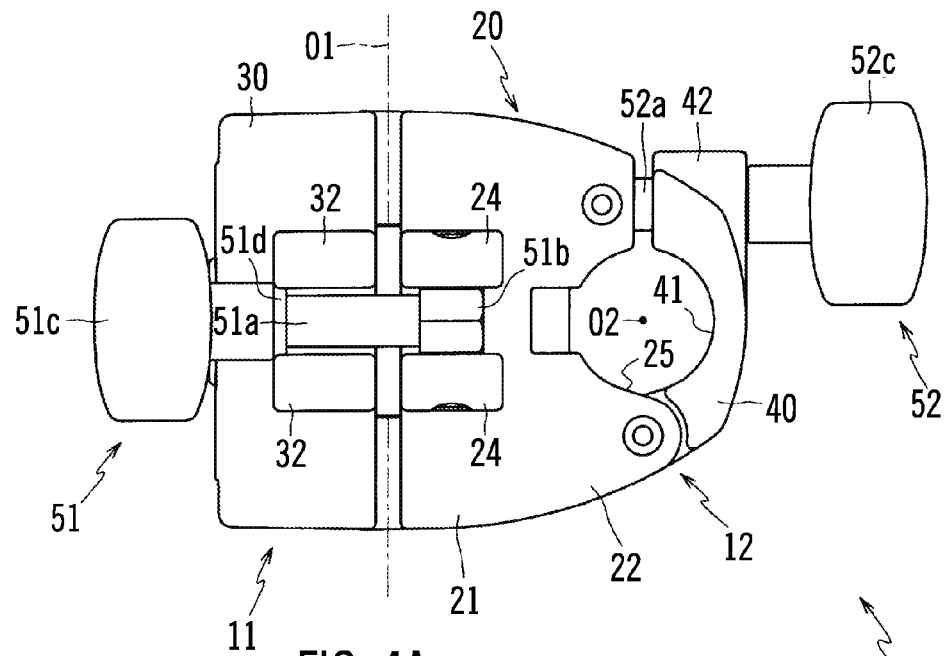
FIG. 4 (a) is a rear side view of the clamp in a direction of an arrow IV (a) in FIG. 3, and FIG. 4 (b) is a rear side view of the clamp in a state in which a first part is opened.
Figure 4B:
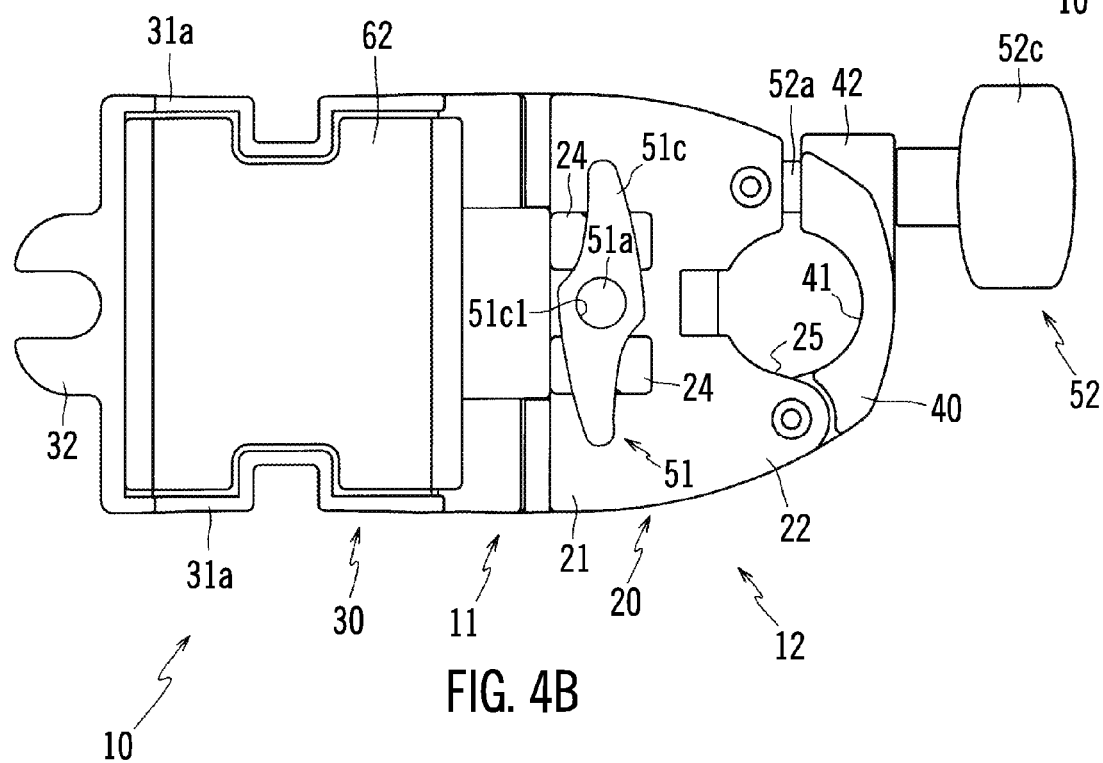

Next, referring to FIGS. 2-4, the structure of the clamp 10 will be described. FIG. 2 is a perspective view of the clamp 10 in a state retaining the curved pipe 3 and the support pipe 4. FIG. 3 is a side view of the clamp 10 viewed in a direction of an arrow III in FIG. 2. FIG. 4 (a) is a rear side view of the clamp 10 in a direction of an arrow IV (a) in FIG. 3. FIG. 4 (b) is a rear side view of the clamp 10 in a state in which a first part 30 is opened. It is noted that illustrations of the curved pipe 3 and the support pipe 4 are omitted in FIG. 3.

As shown in FIG. 2, the clamps 10 are members to couple the support pipes 4 to the curved pipes 3 when the musical instruments to be supported by the support pipes are disposed according to the preference of the performer. The clamp 10 is primarily equipped with a first pipe retaining section 11 and a second pipe retaining section 12. The first pipe retaining section 11 detachably holds and retains the curved pipe 3. The second pipe retaining section 12 detachably holds and retains the support pipe 4.

As shown in FIG. 3, the first pipe retaining section 11 is a portion that holds and retains the curved pipe 3, and is formed in a generally cylindrical shape. The first pipe retaining section 11 is primarily equipped with a first fixing section 21, a first part 30 and a fastening member 51. The first fixing section 21 is formed in a semi-cylindrical shape on one side (on the left side of FIG. 3) of a base section 20 that is a part of the clamp 10. The first part 30 is formed in a semi-cylindrical shape as a part of the clamp 10. Further, the first part 30 is supported in a manner rotatable on its axis on one end side (on the upper side of FIG. 3) of the first fixing section 21. The fastening member 51 is supported in a manner rotatable on its axis on the other end side (on the lower side of FIG. 3) of the first fixing section 21.

The first fixing section 21 is a portion that forms one side of the first pipe retaining section 11. Further, the first fixing section 21 is primarily equipped with a first abutting surface 23, and a pair of bolt fixing sections 24. The first abutting surface 23 is formed in an arc shape, as viewed in a direction of an axis O1 that is an axis of the first pipe retaining section 11 (i.e., in a direction of a line connecting between a center of the opening of the first pipe retaining section 11 at one end side thereof and a center of the opening at the other end side thereof). The pair of bolt fixing sections 24 protrudes from the outer peripheral surface of the other end side (the lower side of FIG. 3).

The first abutting surface 23 forms one side of the internal peripheral surface of the first pipe retaining section 11. Also, the first abutting surface 23 is a portion that retains one side of the curved pipe 3. Further, the pipe sleeve 61 is in contact with the inner side of the first abutting surface 23. The pipe sleeve 61 is formed in a semi-cylindrical shape with a resin material.

The first part 30 is a part in a semi-cylindrical shape that forms the other side of the first pipe retaining section 11. Also, the first part 30 is primarily equipped with a first fastening surface 31, and a first bolt insertion section 32. The first fastening surface 31 is formed in an arc shape as viewed in the axial direction O1. The first bolt insertion section 32 protrudes from the outer peripheral surface of the other end side (the lower side of FIG. 3) of the first part 30. Further, the first part 30 is supported in a manner rotatable on its axis on the one end side (the upper side of FIG. 3) of the first fixing section 21, while maintaining the first fastening surface 31 to face the first abutting surface 23 of the first fixing section 21.

The first fastening surface 31 is a portion that forms the other side of the internal peripheral surface of the first pipe retaining section 11. Also, the first fastening surface 31 is a portion that retains the other side of the curved pipe 3. Further, a pipe sleeve 62 is in contact with the inner side of the first fastening surface 31 (see FIG. 4 (b)). The pipe sleeve 62 is formed in a semi-cylindrical shape with a resin material.

As shown in FIG. 4 (a) or FIG. 4 (b), the pair of first bolt fixing sections 24 are juxtaposed with a predetermined interval provided along the axial direction O1. Also, a bolt shaft section 51b to be described below is inserted between the pair of first bolt fixing sections 24. Also, a rotation shaft passes through the pair of first bolt fixing sections 24 and the bolt shaft section 51b. Also, the bolt shaft section 51b is rotatably supported by the pair of bolt fixing sections 24 about a rotation center.

The first bolt insertion section 32 is formed in a generally U-letter shape as viewed from a side surface direction (in the left-right direction in FIG. 4 (*a*)). Further, a groove is formed in a center portion of the first bolt insertion section 32. The groove opens toward the outside (to the forward side of FIG. 4 (*a*)). Further, a male screw section 51*a* to be described below can be inserted in the groove.

The fastening member 51 is a member that pushes the first part 30 toward the first fixing section 21 for pinching and tightening the curved pipe 3 that is held between the first abutting surface 23 and the first fastening surface 31. The fastening member 51 is primarily equipped with a male screw section 51*a*, a bolt shaft section 51*b*, a handle nut 51*c*, and a washer 51*d*. The male screw section 51*a* is formed in a rod shape with its outer peripheral surface having male threads. The bolt shaft section 51*b* is fixed at one end side of the male screw section 51*a*. Also, the bolt shaft section 51*b* is rotatably supported by the first bolt fixing section 24 on its axis. The handle nut 51*c* is provided with a female screw aperture 51*c*1 in a manner to pass through the handle nut 51*c*. Female screw threads to be in thread-engagement with the male screw section 51*a* are formed on the inner peripheral surface of the female screw aperture 51*c*1. The washer 51*d* is provided between the bolt shaft section 51*b* and the handle nut 51*c*. Also, the washer 51*d* is a ring shaped member, and is loosely mounted on the male screw section 51*a*. Further, a coil spring (not shown) is mounted on the outside of the male screw section 51*a* between the bolt shaft section 51*b* and the washer 51*d*. Moreover, the washer 51*d* is pushed toward the handle nut 51*c* by the coil spring.

Here, a method of fixing the curved pipe 3 by the first pipe retaining section 11 will be described. In order to hold and fix the curved pipe 3 by the first pipe retaining section 11, as shown in FIG. 4 (*a*), first, the handle nut 51*c* is rotated about the male screw section 51*a* as an axis, while the threads of the female screw aperture 51*c*1 engage with the threads of the male screw section 51*a*. The washer 51*d* is pushed toward the handle nut 51*c* side by the coil spring (not shown). Then, the washer 51*d* is pushed, by the handle nut 51*c*, from the other end side of the male screw section 51*a* to the one end side thereof (from the left side to the right side in FIG. 4 (*a*)). As the handle nut 51*c* is kept being rotated, the washer 51*d* that is pushed by the handle nut 51*c* comes in contact with the first bolt insertion section 32. By further rotating the handle nut 51*c*, the first bolt insertion section 32 is pushed toward one end side of the male screw section 51*a* (toward the side of the first bolt fixing section 24) by the pressure force of the handle nut 51*c* that is pushed through the washer 51*d*.

In this manner, by pushing the first part 30 toward the first fixing section 21 by using the pressure force generated at the time of screwing the handle nut 51*c* in the male screw section 51*a*, the curved pipe 3 can be pinched and fixed between the first fixing section 21 and the first part 30.

As shown in FIG. 4 (*a*), the second pipe retaining section 12 is a portion that retains the support pipe 4, and is formed in a generally cylindrical shape. The second pipe retaining section 12 is primarily equipped with a second fixing section 22, a second part 40, and a fastening member 52. The second fixing section 22 is formed in a semi-cylindrical shape on the other side (on the right side of FIG. 4 (*a*)) of the base section 20 that is a part of the clamp 10. The second part 40 is formed in a semi-cylindrical shape as a part of the clamp 10. Further, the second part 40 is supported in a manner rotatable on its axis on one end side (on the lower side of FIG. 4 (*a*)) of the second fixing section 22. The fastening member 52 is supported in a manner rotatable on its axis on the other end side (on the upper side of FIG. 4 (*a*)) of the second fixing section 22.

The second fixing section 22 is formed on the other side of the base section 20. Also, the second fixing section 22 is a portion in a semi-cylindrical shape forming one side of the second pipe retaining section 12. Further, the second fixing section 22 is primarily equipped with a second abutting surface 25, and a second bolt fixing section 26 (see FIG. 3). The second abutting surface 25 is formed in an arc shape as viewed in an axial direction O2 that is an axis of the second pipe retaining section 12 (i.e., in a direction of a line connecting between a center of the opening of the second pipe retaining section 12 on one side thereof and a center of the opening on the other side thereof). The second bolt fixing section 26 continuously passes from the outer peripheral surface of the other end side (the upper side in FIG. 4 (*a*)) to the inner peripheral surface of the second fixing section 22. Also, the second bolt fixing section 26 opens in a direction of a second fastening surface 41 (to the right in FIG. 4 (*a*)). Further, the second bolt fixing section 26 is formed in a groove shape in which a bolt shaft section 52*b* can be inserted. The second abutting surface 25 forms one side of the internal peripheral surface of the second pipe retaining section 12. The second abutting surface 25 is a portion that retains one side of the support pipe 4.

The second part 40 is a member in a semi-cylindrical shape forming the other side of the second pipe retaining section 12. Also, the second part 40 is primarily equipped with a second fastening surface 41 and a second bolt insertion section 42. The second fastening surface 41 is formed in an arc shape as viewed in the axial direction O2. The second bolt insertion section 42 protrudes from the outer peripheral surface of the other end side (the upper side of FIG. 4 (*a*)). Further, the second part 40 is supported in a manner rotatable on its axis on the one end side of the second fixing section 22, while maintaining the second fastening surface 41 to face the second abutting surface 25 of the second fixing section 22. The second fastening surface 41 is a portion forming the other side (the right side in FIG. 4 (*a*)) of the internal peripheral surface of the second pipe retaining section 12. Further, the second fastening surface 41 is a portion that retains the other side of the support pipe 4.

As shown in FIG. 3, the second bolt fixing section 26 is a portion in a groove shape that is provided in a generally right-angle channel shaped recessed state in a cross-sectional view along the axial direction O2 (in a cross-sectional view taken along a line A-A in FIG. 3). Also, the bolt shaft section 52*b* is inserted in the second bolt fixing section 26. Also, a rotation axis is passed through the second bolt fixing section 26 and the bolt shaft section 52*b* along the axial direction O2. The bolt shaft section 52*b* is rotatably supported about the second bolt fixing section 26 as a center axis.

The second bolt insertion section 42 is formed in a generally U-letter shape (see FIG. 2) as viewed in the front surface direction (the left-right direction in FIG. 3). A groove is formed in a central portion of the second bolt insertion section 42. The groove opens toward the outside (the forward side of FIG. 3). Further, a male screw section 52*a* can be inserted in the groove.

The fastening member 52 is a member that pushes the second part 40 toward the second fixing section 22 for pinching and fixing the support pipe 4 that is held between the second abutting surface 25 and the second fastening surface 41. The fastening member 52 has a male screw section 52*a*, a bolt shaft section 52*b*, a handle nut 52*c* and a washer 52*d*. The male screw section 52*a* is formed in a rod shape with its outer peripheral surface having male threads. The bolt shaft section 52b is fixed at one end side of the male screw section 52a. Also, the bolt shaft section 52b is rotatably supported by the second bolt fixing section 26 on its axis. The handle nut 52c is provided with a female screw aperture 52c1 in a manner passing through the handle nut 52c. Female screw threads for thread-engagement with the male screw section 52a are formed on the inner peripheral surface of the female screw aperture 52c1. The washer 52d is provided between the bolt shaft section 52b and the handle nut 52c. Also, the washer 51d is a ring shaped member, and is loosely mounted on the male screw section 52a. Further, a coil spring (not shown) is mounted on the outside of the male screw section 52a between the bolt shaft section 52b and the washer 52d. Moreover, the washer 52d is pushed toward the handle nut 52c side by the coil spring. It is noted that the method of fixing the support pipe 4 by the second pipe retaining section 12 is similar to the method performed with the fastening member 51 described above.

It is noted that the base section 20, the first part 30 and the second part 40 are made of metal such as die-cast aluminum. This can improve the durability, compared to those made of resin material. Further, the necessary pressure can be secured at the time of retaining the curved pipe 3 and the support pipe 4.

Figures 5A, 5B:
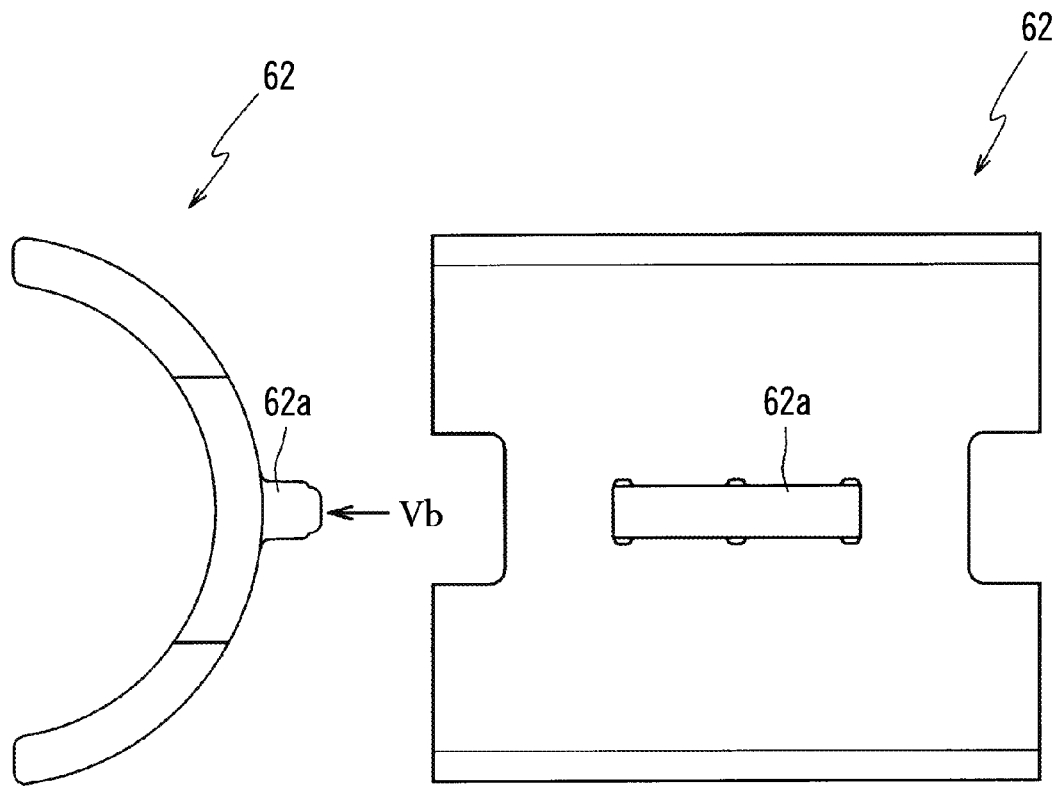
FIG. 5 (a) is a side view of a pipe sleeve, and FIG. 5 (b) is a front view of the pipe sleeve viewed in a direction of an arrow Vb in FIG. 5 (a).

Next, referring to FIG. 5, the structure of the pipe sleeve 62 will be described. FIG. 5 (a) is a side view of the pipe sleeve 62. FIG. 5 (b) is a rear view of the pipe sleeve 62 as viewed in a direction indicated by an arrow Vb in FIG. 5 (a). As the pipe sleeve 61 and the pipe sleeve 62 have an identical shape, only the pipe sleeve 62 will be described.

As shown in FIG. 5 (a) or FIG. 5 (b), the pipe sleeve 62 is a semi-cylindrical member composed of resin material containing glass fibers. Also, the pipe sleeve 62 is formed in a shape that conforms to the shape of the first abutting surface 23 and the first fastening surface 31 (see FIG. 6 (c)).

Also, the pipe sleeve 62 has a pressure-insertion protrusion 62a protruding from a central portion of the outer peripheral surface of the pipe sleeve 62. The pressure-insertion protrusion 62a is provided on its outer wall surface with a plurality of bumps. The pressure-insertion protrusion 62a is pushed in a pressure-insertion hole section 31c formed in the first fastening surface 31 (see FIG. 6 (a)). By this, the plurality of bumps formed on the pressure-insertion protrusion 62a pushed in are pressed against the inner wall surface of the pressure-insertion hole section 31c. As a result, the pressure-insertion protrusion 62a can be more securely fitted in the pressure-insertion hole section 31c. Accordingly, the pipe sleeve 62 can be more reliably mounted on the first fastening surface 31.

It is noted that the resin material used for the pipe sleeve may preferably have a Young's modulus greater than 0.5 GPa but less than 10 GPa. By setting the Young's modulus less than 10 GPa, the curved pipe 3 can be prevented from being damaged by the pipe sleeves 61 and 62 when the curved pipe 3 is clamped and fixed by the clamp 10. Also, the pipe sleeves 61 and 62 can be more readily deformed, conforming to the shape of the curved pipe 3 having a curved configuration. Because of this, a greater contact surface can be secured between the inner peripheral surface of the pipe sleeves 61 and 62 and the curved pipe 3.

By setting the Young's modulus greater than 0.5 GPa, absorption by the pipe sleeves 61 and 62 of the pressure to be generated when pinching and fixing the curved pipe 3 can be suppressed. By this, the pressure can be reliably transferred to the curved pipe 3. Also, compared to rubber or the like having a small Young's modulus, the deformation resisting property to compression can be made higher. For this reason, when fixing the curved pipe 3 with the clamp 10, and even when the pipe sleeves 61 and 62 are repeatedly continuously compressed between the curved pipe 3 and the first abutting surface 23 or the first fastening surface 31, permanent compressive deformation of the pipe sleeves 61 and 62 can be suppressed. Furthermore, the pipe sleeves 61 and 62 can have improved durability.

As the resin material to be used for the pipe sleeves 61 and 62, for example, polyamide, polypropylene, ABS resin, polycarbonate and the like may be used. For example, the pipe sleeves 61 and 62 in accordance with the present embodiment use polyamide compounded with glass fibers. By making glass fibers compounded therein, thermal deformation of the pipe sleeves 61 and 62 due to high temperatures can be suppressed, even when the pipe sleeves 61 and 62 are placed at high temperatures during transportation by ships or the like.

Figure 6A:
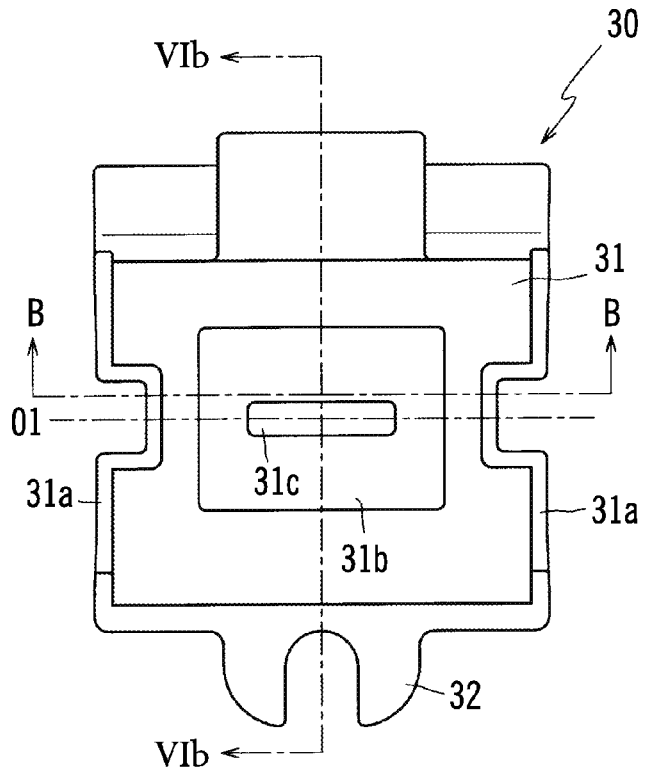
FIG. 6(a) is a rear side view of the first part.
Figure 6B:
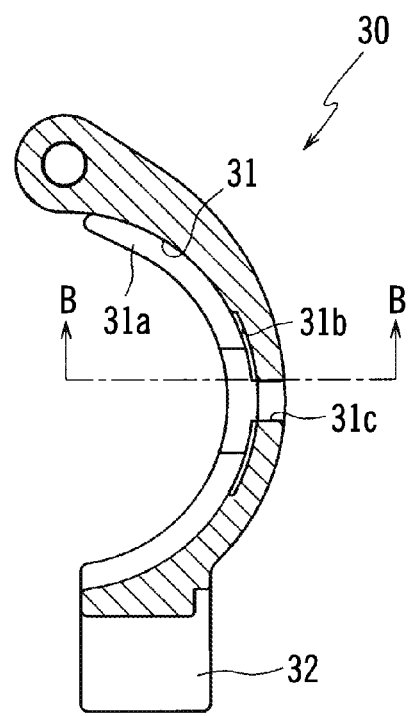
FIG. 6 (b) is a cross-sectional view of the first part taken along a line VIb-VIb in FIG. 6 (a).
Figure 6C:
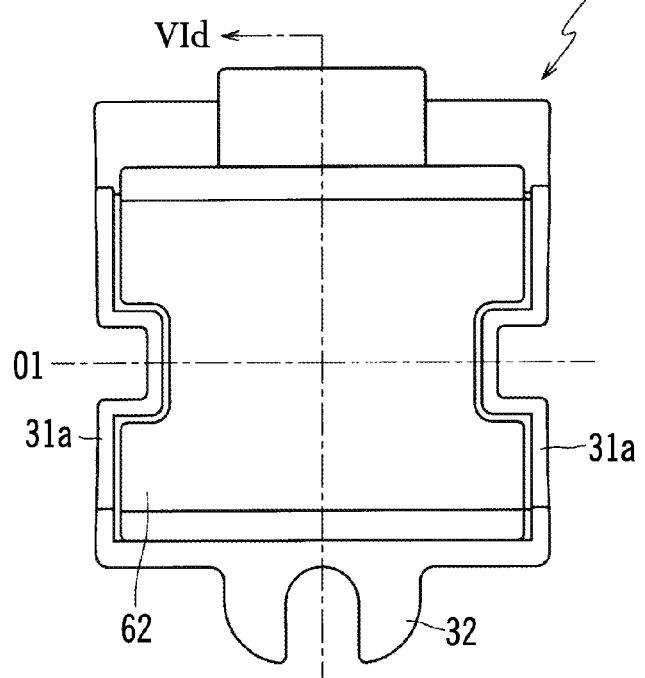
Figure 6D:
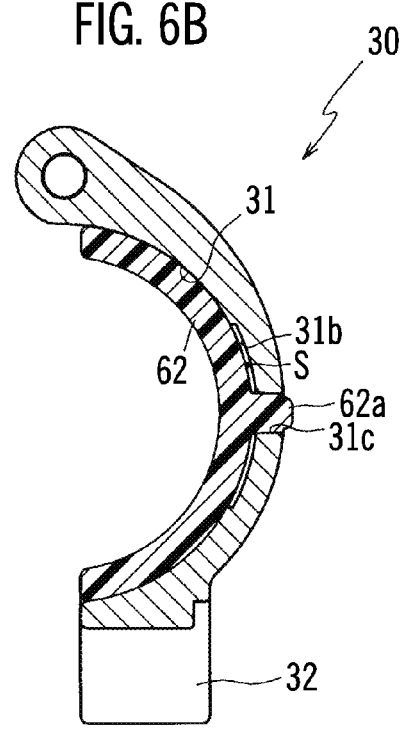

Next, referring to FIG. 6, the detailed structure of the first fastening surface 31 will be described. FIG. 6(a) is a rear side view of the first part 30. FIG. 6 (b) is a cross-sectional view of the first part 30 taken along a line VIb-VIb in FIG. 6 (a). FIG. 6 (c) is a rear side view of the first part 30 in a state in which the pipe sleeve 62 is fitted to the first fastening surface 31. FIG. 6 (d) is a cross-sectional view of the first part 30 taken along a line VId-VId in FIG. 6 (c).

As shown in FIG. 6 (a) or FIG. 6 (b), the first fastening surface 31 has a pair of protruded walls 31a. The pair of protruded walls 31a is provided on both ends of the first fastening surface 31 in the axial direction O1 (in the left-right direction in FIG. 6 (a)), respectively. Also, the pair of protruded walls 31a is provided continuously in a protruded manner in a circumferential direction.

Further, both ends of the first pipe retaining section 11 (see FIG. 4 (b)) in the axial direction O1 (in the left-right direction in FIG. 6 (a)) comprise openings on both sides of the pipe retaining section.

The first fastening surface 31 has a recessed section 31b. The recessed section 31b is formed generally in a central portion of the first fastening surface 31. The recessed section 31b is formed with a depth (depth from the first fastening surface 31 toward the outer peripheral surface side of the first part 30) that is uniform from the first fastening surface 31. Also, the recessed section 31b has a generally right-angle channel shaped cross section as viewed along the axial direction O1 (a cross-sectional view taken along a line B-B in FIG. 6 (a) and FIG. 6 (b)). Furthermore, a pressure-insertion hole 31c is formed generally in a central portion of the recessed section 31b. The pressure-insertion hole 31c penetrates the first part 30 through its outer peripheral surface side. Also, the pressure-insertion protrusion 62a of the pipe sleeve 62 can be inserted in the pressure-insertion hole 31c.

Here, in accordance with the present embodiment, the recessed section 31b is formed to be in a generally rectangular shape in a front view, but may be formed in, for example, a generally rhombus shape or an oval shape, without any particular limitation to the above.

As shown in FIG. 6 (c) or FIG. 6 (d), the outer peripheral surface of the pipe sleeve 62 and the first fastening surface 31 face each other, and the pressure-insertion protrusion 62a is pushed in the pressure-insertion hole 31c, whereby the pipe sleeve 62 is attached to the first fastening surface 31. Also, as the pressure-insertion protrusion 62a is inserted in the pressure-insertion hole 31c, movements of the pipe sleeve 62 in the axial direction O1 (in the left-right direction in FIG. 6 (c)) and in the circumferential direction of the first fastening surface 31 (see FIG. 6 (d)) can be restricted.

The pipe sleeve 62 is formed such that a curved surface configuration of its outer peripheral surface conforms to the curved surface configuration of the first fastening surface 31. For this reason, by attaching the pipe sleeve 62 to the first fastening surface 31, the outer peripheral surface of the pipe sleeve 62 can be brought in contact with the first fastening surface 31. Also, a uniform space S surrounded by the recessed section 31b formed in the first fastening surface 31 and the outer peripheral surface of the pipe sleeve 62 that faces the recessed section 31b is formed between the first fastening surface 31 and the pipe sleeve 62.

The greater the area occupied by the recessed section 31b in the first fastening surface 31, the smaller the contact surface between the outer peripheral surface of the pipe sleeve 62 and the first fastening surface 31. For this reason, for example, if the recessed section 31b is formed entirely over the first fastening surface 31 in the circumferential direction (in the up-down direction in FIG. 6 (a): see FIG. 6 (d)), the contact surface between the outer peripheral surface of the pipe sleeve 62 and the first fastening surface 31 becomes smaller by the corresponding amount. Consequently, the pressure generated at the time of pinching and fixing the curved pipe 3 by the first pipe retaining section 11 (the force generated upon screwing the fastening member 51 which pushes the first part 30 toward the first fixing section 21) cannot be sufficiently transmitted to the curved pipe 3.

In contrast, in accordance with the present embodiment, the recessed section 31b is formed generally in a central portion of the first fastening surface 31. Therefore, the outer peripheral surface of the pipe sleeve 62 and the first fastening surface 31 can be brought in contact with each other at two sides interposing the recessed section 31b in the axial direction O1 (in the left-right direction in FIG. 6 (a)), and at two sides interposing the recessed section 31b in the circumferential direction of the first fastening surface 31. Therefore, a wide contact area can be secured between the outer peripheral surface of the pipe sleeve 62 and the first fastening surface 31. Accordingly, the pressure generated at the time of pinching and fixing the curved pipe 3 by the first pipe retaining section 11 can be reliably transmitted to the curved pipe 3 through the pipe sleeve 62.

Further, when the pipe sleeve 62 is mounted on the first fastening surface 31, the pipe sleeve 62 is disposed between the pair of protruded walls 31a. The tips of the protruded walls 31a are formed lower than the inner peripheral surface of the pipe sleeve 62. For this reason, when fixing the curved pipe 3 to the first pipe retaining section 11, the inner peripheral surface of the pipe sleeve 62 can be brought in contact with and abutted against the outer peripheral surface of the curved pipe 3, whereby the tips of the protruded walls 31a can be prevented from contacting the curved pipe 3. This makes it possible to avoid deformation and damage to the curved pipe 3, which could result from the tips of the protruded walls 31a if they push the curved pipe 3 by the pressure generated at the time of pinching and fixing the curved pipe 3 by the first pipe retaining section 11.

Also, when the pipe sleeve 62 is not mounted, if the clamp 10 is slidably moved along the curved pipe 3 in a state in which the curved pipe 3 is loosely inserted in the clamp 10, a large frictional force is generated at the contact surface between the curved pipe 3 made of metal and the first fastening surface 31 made of metal. The curved pipe 3 and the first fastening surface 31 are made of metal. Therefore, mutual contact between the curved pipe 3 and the first fastening surface 31 may cause scratches on the surfaces of the curved pipe 3 and the first fastening surface 31. This would make the surfaces of the curved pipe 3 and the first fastening surface 31 more readily bite into each other, which increases the frictional force generated when slidably moving the curved pipe 3. Accordingly, a greater force is required when slidably moving the curved pipe 3, and the slidable movement thereof generates noise.

In contrast, in accordance with the present embodiment, the pipe sleeve 62 made of a resin material is interposed between the curved pipe 3 and the first fastening surface 31. Therefore, when the clamp 10 is slidably moved along the curved pipe 3 in a state in which the curved pipe 3 is loosely inserted in the clamp 10, the surfaces of the curved pipe 3 and the first fastening surface 31 can be prevented from being scratched. Consequently, the frictional force generated when slidably moving the curved pipe 3 can be reduced. Therefore, the clamp 10 can be smoothly slidably moved. Further, generation of noise due to slidable movements of the clamp 10 and damage to the curved pipe 3 can be suppressed.

The present embodiment is described as to a case in which the pipe sleeve 62 is mounted to the first fastening surface 31 by pushing the pressure-insertion protrusion 62a formed on the outer peripheral surface of the pipe sleeve 62 into the pressure-insertion hole 31c. However, without being limited to the above, the outer peripheral surface of the pipe sleeve may be formed with a flat surface, and the outer peripheral surface can be bonded to the first fastening surface 31.

In this instance, the first fastening surface 31 is provided with the protruded walls 31a in a protruded form, and the tips of the protruded walls 31a are positioned higher than the outer peripheral surface of the pipe sleeve to be abutted against the first fastening surface 31. Accordingly, even when the bonding between the first fastening surface 31 and the outer peripheral surface of the pipe sleeve is released, the pipe sleeve is prevented from slipping out of the opening section of the first pipe retaining section 11 because of the protruded walls 31a located at the opening of the first pipe retaining section 11.

It is noted that the first abutting surface 23 has protruded walls 23a, a recessed section 23b and a pressure-insertion hole 23c, and their actions are similar to those of the first fastening surface 31. Accordingly, description thereof shall be omitted. Also, the second abutting surface 25 and the second fastening surface 41 are equipped with recessed sections 25b and 41b, respectively, and the recessed sections 25b and 41b are structured in a manner similar to the recessed section 31b formed in the first fastening surface 31.

Figure 7:
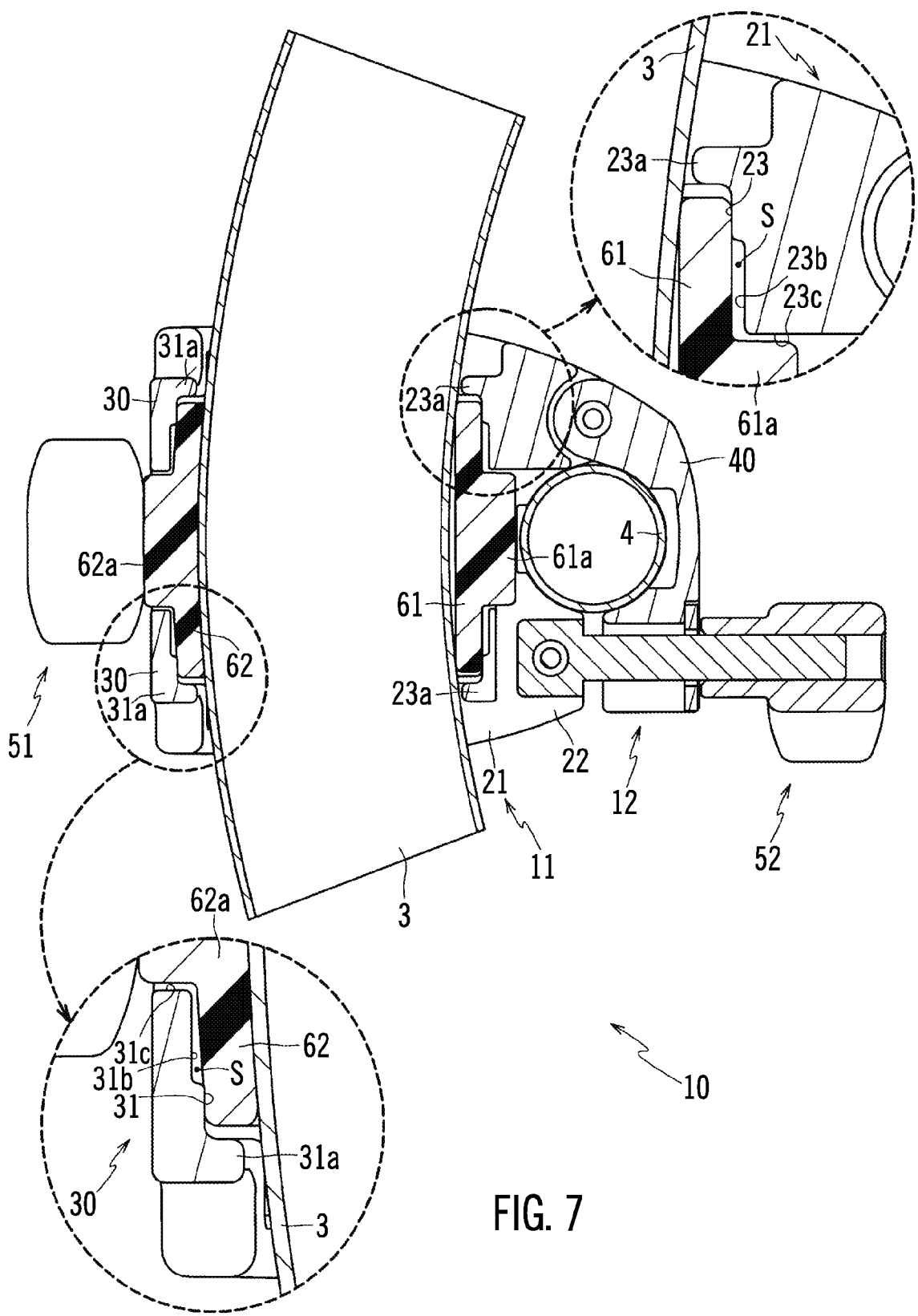
FIG. 7 is a cross-sectional view of the clamp in a state retaining the curved pipe taken along a line VII-VII in FIG. 3.

Next, referring to FIG. 7, a method of retaining and fixing the curved pipe 3 with the clamp 10 will be described. FIG. 7 is a cross-sectional view of the clamp 10 taken along a line VII-VII in FIG. 3 in a state in which the curved pipe 3 is retained.

When retaining the curved pipe 3 with the clamp 10, first, the outwardly bent portion of the curved pipe 3 is faced to the recessed section 23b or the recessed section 31b. Here, the recessed section 23b is formed in the first abutting surface 23. Also, the recessed section 31b is formed in the first fastening surface 31. In this state, the curved pipe 3 is disposed between the first fixing section 21 and the first part 30. In the present embodiment, the description will be made as to a case where the outwardly bent portion of the curved pipe 3 is disposed in a manner to face the recessed section 31b formed in the first fastening surface 31.

Next, the curved pipe 3 is pinched and retained by the first abutting surface 23 of the first fixing section 21 and the first fastening surface 31 of the first part 30. In this state, the fastening member 51 that is rotatably supported about the bolt fixing section 24 of the first fixing section 21 is rotated. Then, the male screw section 51*a* is inserted in the bolt insertion section 32 (see FIG. 4 (*a*) and FIG. 4 (*b*)).

Then, as described above, the threads of the female screw aperture 51*c*1 of the handle nut 51*c* are engaged with the threads of the male screw section 51*a*. Then the handle nut 51*c* and the washer 51*d* are moved in a screw-in direction (to the right direction in FIG. 7). By this, the first bolt insertion section 32 formed at the first part 30 is pushed against the handle nut 51 through the washer 51*d*. Then, the first part 30 is pushed toward the first fixing section 21.

As the first part 30 is pushed toward the first fixing section 21, the pair of pipe sleeves 61 and 62 mounted on the first abutting surface 23 and the first fastening surface 31 are brought in contact with the outer peripheral surface of the curved pipe 3. At this time, the outer peripheral surface of the curved pipe 3 on the side of the outwardly bent portion contacts the inner peripheral surface of the pipe sleeve 62 (on the right side in FIG. 7) in a central portion of the pipe sleeve 62 mounted on the first fastening surface 31 along the longitudinal direction of the curved pipe 3. Then, the outer peripheral surface of the curved pipe 33 on the side of its inwardly bent portion contacts the inner peripheral surface (on the left side in FIG. 7) of the pipe sleeve 61 at the two end sides (the sides in the up-down direction in FIG. 7) of the pipe sleeve 61 mounted on the first abutting surface 23 in the longitudinal direction of the curved pipe 3.

At portions of the pipe sleeve 61 that are in contact with the outer peripheral surface of the curved pipe 3 on the inwardly bent side (the inner peripheral surface of the pipe sleeve 61 at two end side portions in the longitudinal direction), the pipe sleeve 61 are in contact at its outer peripheral surface side with the first abutting surface 23. Therefore, the more the first part 30 is pressed against the first fixing section 21, the greater the pressure force from the first abutting surface 23 is transferred to the curved pipe 3 through the pipe sleeve 61. Accordingly, a greater force to push the curved pipe 3 toward the first fastening surface 31 (to the left side in FIG. 7) can be applied.

On the other hand, the recessed section 31*b* is formed in the first fastening surface 31. Therefore, a portion of the pipe sleeve 62 that is in contact with the outer peripheral surface of the curved pipe 3 on the outwardly bent side (the central portion of the curved pipe 3 in the longitudinal direction thereof) cannot contact the first fastening surface 31, and therefore the pressure force from the first fastening surface 31 cannot be transmitted thereto.

Therefore, as the first part 30 is pressed against the first fixing section 21, a portion of the pipe sleeve 62 where its outer peripheral surface is disposed opposite to the recessed section 31*b* is pushed by the outwardly bent portion of the curved pipe 3, thereby being pushed inside the space S. Accordingly, even when the pipe sleeve 62 is made of a resin material containing glass fibers which is hard to be deformed, the pipe sleeve 62 can be readily deformed according to the outwardly bent shape of the curved pipe 3. Therefore, a wider contact area can be secured between the pipe sleeve 62 and the curved pipe 3.

Also, when the pipe sleeve 62 is curved according to the outwardly bent shape of the curved pipe 3, the outer peripheral surface of the pipe sleeve 62 is in contact with the first fastening surface 31 on both sides (on the upper side and the lower side in FIG. 7) of the recessed section 31*b* in the axial direction O1 (see FIG. 3). Therefore the pressure force generated through pushing the first part 30 toward the first fixing section 21 is transmitted from the surface where the outer peripheral surface of the pipe sleeve 62 is in contact with the first fastening surface 31 (the two end sides of the recessed section 31*b* in the axial direction O1). Accordingly, the curved pipe 3 can be pushed toward the first fixing section 21 (to the right side in FIG. 7).

In this manner, the pressure force that pushes the first part 30 toward the first fixing section 21 is transmitted to the curved pipe 3 through the pipe sleeves 61 and 62. This allows the curved pipe 3 to be pinched and fixed by the first pipe retaining section 11. Also, the curved pipe 3 is retained through the pipe sleeves 61 and 62 made of a resin material. Therefore, a greater contact area with the curved pipe 3 can be secured, compared to a case where the curved pipe 3 is retained by bringing the first abutting surface 23 and the first fastening surface 31 in direct contact with the curved pipe 3. Accordingly, the pressure to pinch and fix the curved pipe 3 can be more effectively transmitted to the curved pipe 3. In other words, the curved pipe 3 can be more securely retained.

Here, the fastening member 51 is structured to pinch and fix the curved pipe 3 in a manner that, as the handle nut 51*c* is screwed into the male screw section 51*a*, it pushes the first bolt insertion section 32 through the washer 51*d*, whereby the first part 30 is pushed toward the first fixing section 21. Accordingly, the pressure force to pinch and fix the curved pipe 3 is applied in a direction along an axial direction (the left-right direction in FIG. 7) of the male screw section 51*a*.

On the other hand, the recessed sections 23*b* and 31*b* open in a direction along the axial direction of the male screw section 51*a*. For this reason, as the outwardly bent portion of the curved pipe 3 that is in a curved configuration is disposed in a manner to face either the recessed section 23*b* or 31*b*, the pressure force generated through screwing in the handle nut 51*c* can be used effectively as a pressure force to allow the outwardly bent portion of the curved pipe 3 to push the pipe sleeves 61 and 62 into the space S. Accordingly, the pipe sleeves 61 and 62 can be made more deformable. Therefore, a greater contact area can be secured between the pipe sleeves 61 and 62 and the curved pipe 3. Thus the curved pipe 3 can be more reliably pinched and fixedly retained.

Furthermore, the pressure-insertion holes 23*c* and 31*c* are formed penetrating in the axial direction of the male screw section 51*a*. For this reason, as the outwardly bent portion of the curved pipe 3 that is in a curved configuration is disposed in a manner to face either the recessed section 23*b* or 31*b*, the pressure force for pinching and fixing the curved pipe 3 can be used effectively as a pressure force to allow the outwardly bent portion of the curved pipe 3 to push the pressure-insertion protrusions 61*a* and 62*a* in the pressure-insertion holes 23*c* and 31*c*. Accordingly, the fixed state in which the pipe sleeves 61 and 62 are pressed against the first abutting surface 23 and the first fastening surface 31 can be prevented from being released.

When the recessed section 23*b* or 31*b* is formed, in the axial direction O1, at one end (for example on the upper side in FIG. 7) of the first abutting surface 23 or the first fastening surface 31 or at both ends (the upper side and the lower side in FIG. 7) thereof, the outer peripheral surface of the pipe sleeve 61 or 62 has one contact surface with the first abutting surface 23 or the first fastening surface 31.

In contrast, in accordance with the present embodiment, each of the recessed sections 23*b* and 31*b* is formed generally in the central area of each of the first abutting surface 23 and the first fastening surface 31. For this reason, the outer peripheral surface of the pipe sleeve 61 or 62 and the first abutting surface 23 or the first fastening surface 31 can be brought in contact with each other at two surfaces on one side and the other side (on the upper side and the lower side in FIG. 7) interposing the recessed section 23*b* or 31*b*, respectively.

Therefore the pressure force to pinch and fixedly retain the curved pipe 3 can be more reliably transmitted to the curved pipe 3.

If the recessed section 23b or 31b is provided in only one of the first abutting surface 23 and the first fastening surface 31, and if the clamp 10 that pinches and fixes the curved pipe 3 with the outwardly bent portion thereof being disposed opposite to the recessed section 23b or 31b is rotated through 180 degrees about the curved pipe 3 as an axis, the outwardly bent portion of the curved pipe 3 cannot be disposed opposite to the recessed section 23b or 31b. For this reason, in order to secure the retaining force on the curved pipe 3, the clamp currently in use needs to be changed with a clamp with different arrangement of the recessed section 23b or 31b.

In contrast, in the clamp 10 in accordance with the present embodiment, the recessed sections 23b and 31b are formed in both of the first abutting surface 23 and the first fastening surface 31, respectively. For this reason, even when the clamp 10 that pinches and fixes the curved pipe 3 with the outwardly bent portion thereof being disposed opposite to the recessed section 23b or 31b is rotated through half a full rotation about the curved pipe 3 as an axis, the outwardly bent portion of the curved pipe 3 can be disposed opposite to recessed section 23b or 31b, whereby the work efficiency can be improved.

In other words, it is possible to select between two methods, i.e., the method of disposing the outwardly bent portion of the curved pipe 3 opposite to the recessed section 23b, and the method of disposing the same to orient in a direction in which the recessed section 31b is located. Accordingly, there are many possible orientations of the clamp 10 at the time of retaining the pipe.

Further, when the recessed sections 23b and 31b are recessed in an arc shape in a cross section as viewed along the axial direction O1 (in a cross-sectional view taken along a line B-B in FIG. 6 (a) and FIG. 6 (b)), and if the R (radius) of each of the recessed sections 23b and 31b formed in an arc shape does not match with the R of the curved pipe 3 to be retained, a sufficient contact area cannot be secured between the pipe sleeve 61 or 62 and the curved pipe 3.

In contrast, in accordance with the present embodiment, the recessed sections 23b and 31b have a constant depth from the first abutting surface 23 and the first fastening surface 31, respectively, and are provided in a generally right angled channel shape in a cross-sectional view as viewed along the axial direction O1. For this reason, the space S can secure a greater volume. Accordingly, the curved pipe 3 in a curved configuration whose radius is set within a predetermined range can be reliably retained.

Also, as described above, the tips of the protruded walls 23a are at a lower position than the inner peripheral surface of the pipe sleeve 61. For this reason, when the curved pipe 3 in a curved configuration is to be retained at the side of its inwardly bent portion (on the right side in FIG. 7), the tips of the protruded walls 23a and the curved pipe 3 can be prevented from contacting each other. Accordingly, this makes it possible to suppress deformation and damage to the curved pipe 3, which could result from the tips of the protruded walls 31a if they push the curved pipe 3 by the pressure generated at the time of holding and fixing the curved pipe 3. In particular, in accordance with the present embodiment, the pipe sleeves 61 and 62 are made of reinforced plastic compounded with glass fibers that has a Young's modulus higher than that of resins such as rubber and the like. Therefore, a high degree of deformation-resisting property against pressures generated at the time of holding and fixing the curved pipe 3 is secured. Therefore, even when the difference in height between the inner peripheral surface of the pipe sleeve 61 and the tips of the protruded walls 23a is small, contacts between the tips of the protruded walls 23a and the curved pipe 3 can be effectively suppressed.

Next, referring to FIGS. 8 through 10, the structure of the pipe holder 100 in accordance with the second embodiment will be described. The first embodiment has been described as to a case where the curved pipe 3 in a curved configuration is retained by the first fixing section 21 and the first part 30, and the pipe 4 that supports musical instruments is supported by the second fixing section 22 and the second part 40. In accordance with the second embodiment, the upstanding pipe 2 in a linear shape that stands upright on the ground is retained by the first fixing section 21 and the first part 30, and a container pipe 3a that contains connector cables 5 is retained by a second fixing section 122 and a second part 140. It is noted that components that are the same as those of the first embodiment described above will be appended with the same reference numbers, and their description will be omitted.

Figure 8:
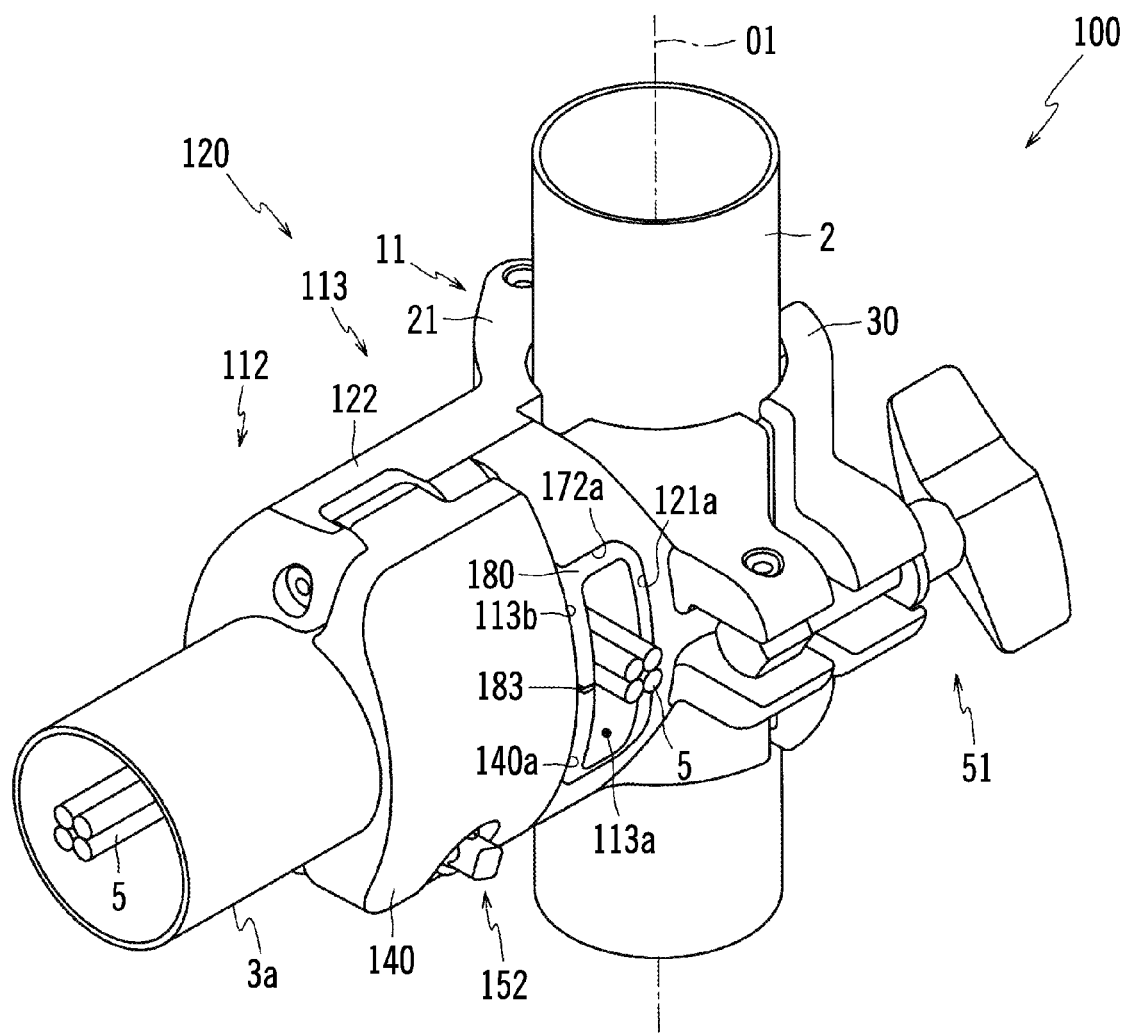
FIG. 8 is a perspective view of the pipe holder in accordance with the second embodiment.

FIG. 8 is a perspective view of the pipe holder 100 in accordance with the second embodiment. FIG. 9 (a) is a top side view of the pipe holder 100. FIG. 9 (b) is a cross-sectional view of the pipe holder 100 taken along a line IXb-IXb in FIG. 9 (a) in a state retaining a vertical upstanding pipe 2. FIG. 10 (a) is a cross-sectional view of the pipe holder 100 taken along a line Xa-Xa in FIG. 9 (a). FIG. 10 (b) is a side view of the pipe holder 100 in a state in which a second part 140 is opened. It is noted that FIG. 10 (b) omits illustration of a fastening member 152.

As shown in FIG. 8, the pipe holder 100 is a member that connects an upstanding pipe 2 and a container pipe 3a. Further, the pipe holder 100 is a member that guides a connection cable 5 stored in the container pipe 3a to the outside. The pipe holder 100 has a first pipe retaining section 11, a second pipe retaining section 112 and a coupling section 113. The first pipe retaining section 11 retains the upstanding pipe 2. The second pipe retaining section 112 retains the container pipe 3a that contains the connection cable 5. The coupling section 113 connects the first pipe retaining section 11 and the second pipe retaining section 112. A cable sleeve 180 composed of an elastic material is fitted in the coupling section 113.

The container pipe 3a is a tubular member that contains the connection cable 5 therein among plural curved pipes 3 to be used for the musical instrument stand 1 (see FIG. 1). Also, the connection cable 5 is a member that electrically connects electronic musical instruments such as electronic drums and electronic cymbals with equipments such as a sound generator and the like.

Figure 9A:
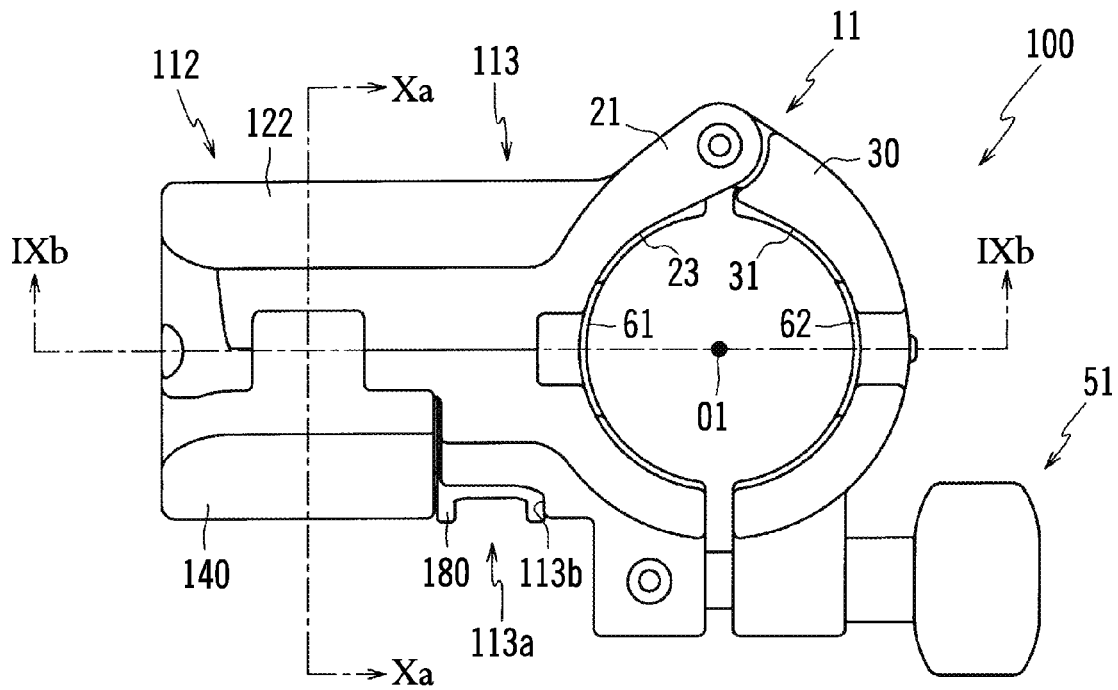
FIG. 9 (a) is a top side view of the pipe holder.
Figure 9B:
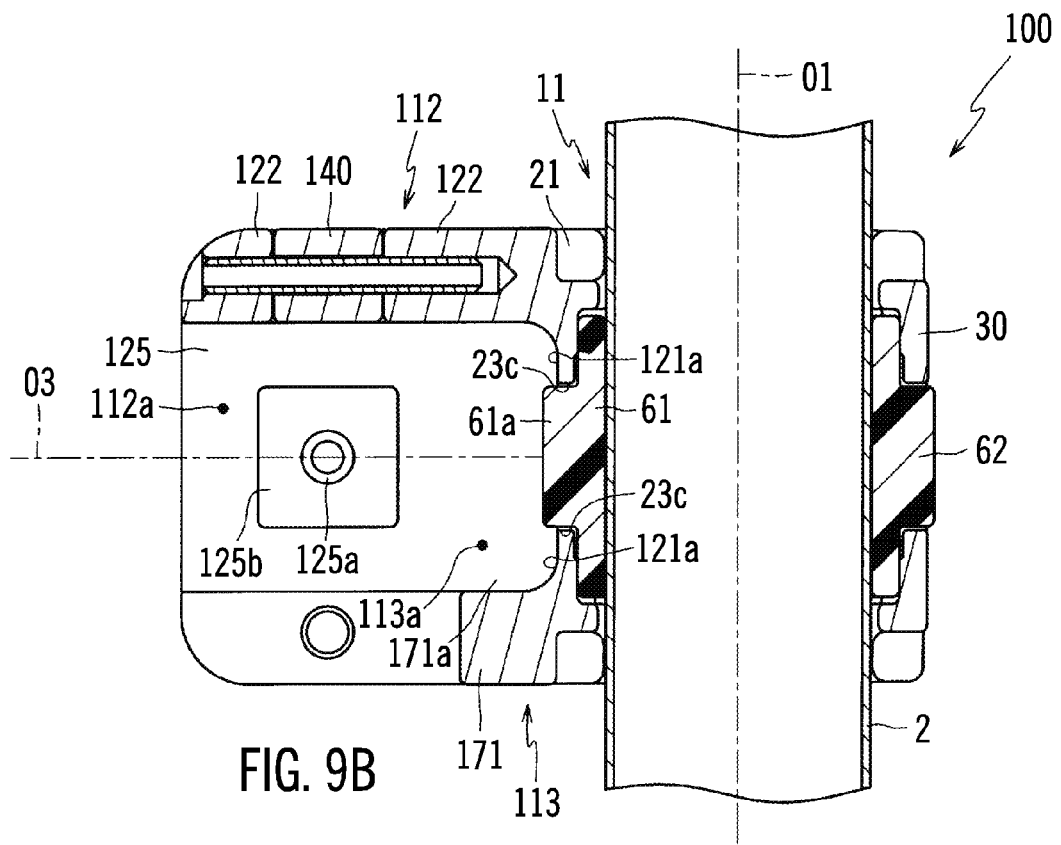
Figure 11A:
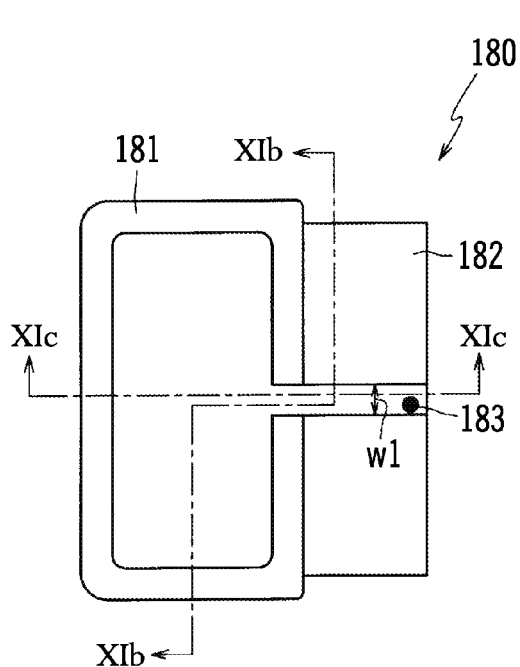
FIG. 11 (a) is a front view of the cable sleeve.
Figure 11B:
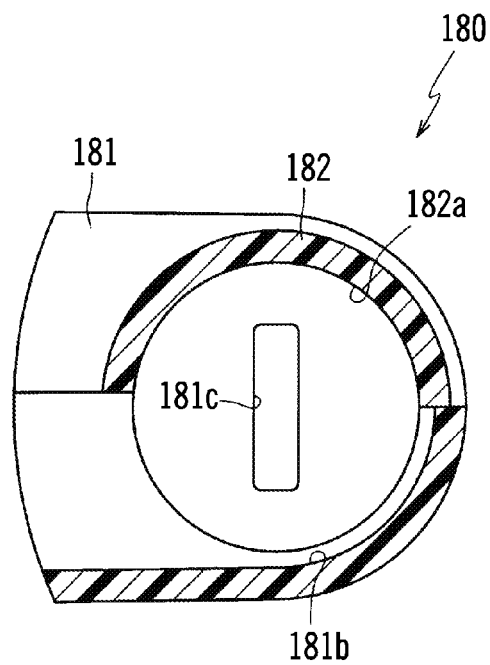
Figure 11C:
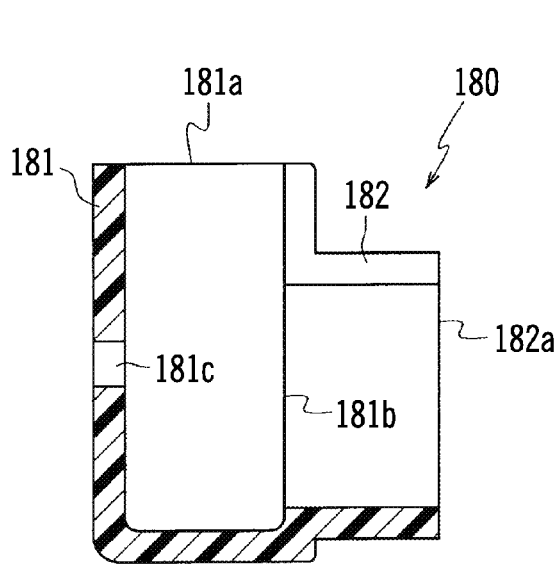
Figure 11D:
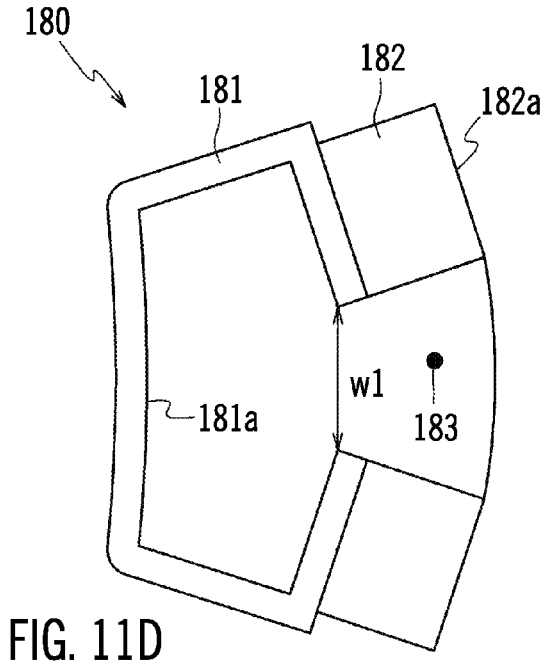

As shown in FIG. 9 (a), for retaining the upstanding pipe 2 by the first pipe retaining section 11, the pressure force that pushes the first part 30 against the first fixing section 21 is transmitted to the upstanding pipe 2 through the pipe sleeves 61 and 62. This holds and fixedly retains the upstanding pipe 2. As described above, recessed sections 23b and 31b are formed in the first abutting surface 23 and the first fastening surface 31, respectively, generally in central portions thereof, in other words, in portions thereof in their circumferential direction (see FIG. 6 (a)). Accordingly, for example, a wider contact area can be secured between the outer peripheral surface of the pipe sleeve 62 and the first fastening surface 31, compared to a case where the recessed section 23b or 31b is formed entirely along the circumferential direction of the first abutting surface 23 or the first fastening surface 31. Also, each of the pipe sleeves 61 and 62 is formed in a semi-cylindrical shape (see FIG. 5 (a)). Accordingly, the pressure generated at the time of pinching and fixing by the first pipe retaining section 11 can be reliably transmitted to the upstanding pipe 2 in a linear shape through the pipe sleeves 61 and 62.

As shown in FIG. 8 and FIG. 10, the second pipe retaining section 112 is a portion that retains the container pipe 3a. The second pipe retaining section 112 is primarily equipped with a second fixing section 122, a second part 140, a fastening member 152 and a second retaining chamber 112a (see FIG. 9 (b)). The second fixing section 122 is formed on the other side (on the frontward side in FIG. 10 (a)) of a base section 120 that is a part of the pipe holder 100. The second part 140 is a part of the pipe holder 100 and is rotatably supported on its axis on one end side (on the upper side in FIG. 10 (a)) of the second fixing section 122. The fastening member 152 tightens and fixes the second part 140 to the second fixing section 122. The second retaining chamber 112a is surrounded by the second fixing section 122 and the second part 140 (see FIG. 9 (b)).

As shown in FIG. 9 (b) or FIG. 10, the second fixing section 122 is formed on the other side (on the left side in FIG. 9 (b)) of the base section 120. Further, the second fixing section 122 is a portion that forms one of the sides (the left side in FIG. 10 (a)) of the second pipe retaining section 112. The second fixing section 122 is primarily equipped with a second abutting surface 125 and a nut stopper section 126. The second abutting surface 125 is formed in an arc shape as viewed in an axial direction O3 that is an axis of the second pipe retaining section 112 (in a direction along a line connecting between the first pipe retaining section 11 and the second pipe retaining section 112; in the left-right direction in FIG. 9 (b)). The nut stopper section 126 is formed on the other end side of the second fixing section 122 (on the lower side in FIG. 9 (b)). The nut stopper section 126 is provided with a through-hole formed therein through which a shaft section 152a1 of the fastening member 152 to be described below can be passed.

The second abutting surface 125 forms one of the sides of the inner peripheral surface of the second pipe retaining section 112 (the left side in FIG. 10 (a)). Further, the second abutting surface 125 is a portion that retains one of the sides of the container pipe 3a. The second abutting surface 125 is formed with a recessed section 125b. Further, the recessed section 125b is provided, generally in a central portion thereof, with a protrusion 125a that can be fitted in an aperture (not shown) that is formed in the container pipe 3a penetrating therein.

The second part 140 is a part that forms the other side (the right side in the FIG. 10 (a)) of the second pipe retaining section 112. The second part 140 has a second fastening surface 141 and a bolt stopper section 142. The second fastening surface 141 is formed in an arc shape as viewed in the axial direction O3. The bolt stopper section 142 is formed on the other side (the lower side in FIG. 10 (a)) of the second fixing section 122. Further, the bolt stopper section 142 is provided with a through-hole through which the shaft section 152a1 of the fastening member 152 to be described below can be passed. Further, the second part 140 is rotatably supported on its axis on the one end side of the second fixing section 122 (on the upper side in the FIG. 10 (b)), while keeping the second fastening surface 141 to be opposite to the second abutting surface 125 of the second fixing section 122. The second fastening surface 141 forms the other side of the inner peripheral surface of the second pipe retaining section 112 (the right side in FIG. 10 (a)). Further, the second fastening surface 141 is a portion that retains the other side of the container pipe 3a.

The fastening member 152 is a member for pressing the second part 140 toward the second fixing section 122 when pinching and fixing the container pipe 3a held between the second abutting surface 25 and the second fastening surface 141. The fastening member 152 has a bolt section 152a and a nut section 152b. The bolt section 152a has a shaft section 152a1 and a head section 152a2. Male threads are formed on the outer peripheral surface of the shaft section 152a1. The head section 152a2 can be fitted in the bolt stopper section 142. The nut section 152b threads can be engaged with the threads of the shaft section 152a1.

For holding and fixing the container pipe 3a with the second pipe retaining section 112, first, the shaft section 152a1 is passed through the holes formed in the second fixing section 122 and the second part 140 from the side of the bolt stopper section 142. The nut section 152b threads are engaged with the threads of the tip portion of the shaft section 152a1 that is passed from the side of the bolt stopper section 142 to the side of the nut stopper section 126. By this, the head section 152a2 is stopped at the bolt stopper section 142. Further the nut section 152b is stopped at the nut stopper section 126. Accordingly, the second part 140 is tightened and fixed toward the second fixing section 122. By this, the second part 140 is pushed toward the second fixing section 122. This enables the container pipe 3a to be held and fixed between the second fixing section 122 and the second part 140.

As shown in FIG. 9 (b) and FIG. 10 (b), the coupling section 113 is a portion that connects the first pipe retaining section 11 and the second pipe retaining section 112. Further, the coupling section 113 has a guide groove section 171, a pair of guide extension sections 172 and a guide chamber 113a.

The guide groove section 171 is provided in a manner to extend from the second fixing section 122 in the axial direction O3 (to the right side in FIG. 9 (b)). Further, the guide groove section 171 is a portion that is provided in a manner connected to the first fixing section 21. The guide groove section 171 has a guide groove wall 171a. The guide groove wall 171a is formed with a cylindrical inner peripheral surface on the same surface with the second abutting surface 125.

The pair of guide extension sections 172 extends from both ends of the guide groove section 171 that is oriented in the same direction (the right direction in FIG. 10 (a)) as that of the guide groove wall 171a. The guide extension sections 172 are separated by a gap in which a first sleeve section 181 of a cable sleeve 180 to be described below can be inserted. Also, the pair of guide extension sections 172 has a pair of guide extension walls 172a. The pair of guide extension walls 172a are formed on the same surface with the guide groove wall 171a. The guide groove wall 171a and the pair of guide extension walls 172a are formed in a generally U-letter shape as viewed from the side.

The guide chamber 113a is a space that is surrounded by the guide groove wall 171a and the guide extension walls 172a. The guide chamber 113a is closed by a first close wall 121a on its one end side (the right side in FIG. 9 (b)) in the axial direction O3. The first close wall 121a is formed in a plane surface perpendicular to the guide groove wall 171a and the guide extension walls 172a. Also, the guide chamber 113a has the other end in the axial direction O3 (on the left side in FIG. 9 (b)) connected to a second retaining chamber 112a. Further, the guide chamber 113a is closed partially by a second close wall 140a. The second close wall 140a forms an external surface of the second part 140, and faces the first close wall 121a (see FIG. 8).

The first close wall 121a is a plane shaped portion that is formed oriented in an opposite direction of the first abutting surface 23 formed in the first fixing section 21. A pressure-insertion hole 23c that is formed in the first abutting surface 23 penetrates the first close wall 121a. For this reason, a tip of the pressure-insertion protrusion 61a of the pipe sleeve 61 mounted on the first abutting surface 23 protrudes from the first close wall 121a into the guide chamber 113a.

The cable sleeve 180 is a member made of an elastic member. As shown in FIG. 8, the cable sleeve 180 is fitted inside a guide opening section 113b. The guide opening section 113b is formed by the guide extension wall 172a, the first close wall 121a and the second close wall 140a. Further, the guide opening section 113b is formed in a generally rectangular shape that opens the guide chamber 113a to the outside.

Next, referring to FIG. 11, a detailed structure of the cable sleeve 180 will be described. FIG. 11 (a) is a front view of the cable sleeve 180. FIG. 11 (b) is a cross-sectional view of the cable sleeve 180 taken along a line XIb-XIb in FIG. 11 (a). FIG. 11 (c) is a cross-sectional view of the cable sleeve 180 taken along a line XIc-XIc in FIG. 11 (a). FIG. 11 (d) is a front view of the cable sleeve 180 in a state in which a slit 183 with a cut width W1 is opened wider.

As shown in FIG. 11 (a), the cable sleeve 180 has a first sleeve section 181 and a second sleeve section 182. The first sleeve section 181 is formed in a rectangular cylindrical shape that can be fitted inside the guide opening section 113b. The second sleeve section 182 connects to a side surface of the first sleeve section 181 on one of the sides thereof. The second sleeve section 182 is formed in a cylindrical shape that can be fitted inside the container pipe 3a.

As shown in FIG. 11 (b) and FIG. 11 (c), the first sleeve section 181 is formed in a rectangular cylindrical shape. The first sleeve section 181 has a first opening section 181a, a first hole section 181b, and a second hole section 181c. The first opening section 181a opens on one end of the first sleeve section 181. The first hole section 181b opens in a side surface of the first sleeve section 181 on one of the sides thereof (the right side in FIG. 11 (c)). The first hole section 181b is formed in a circular shape having a diameter equal to or greater than the inner diameter of the inner peripheral surface of the second sleeve section 182. The second hole section 181c is opened in a side surface on the other side (the left side in FIG. 11 (c)). The second hole section 181c is formed in a rectangular shape in which the pressure-insertion protrusion 61a can be fitted.

The second sleeve section 182 has a second opening section 182a. The second sleeve section 182 connects at its another end (the left side in FIG. 11 (c)) to the side surface of the first sleeve section 181 on one side thereof at a position corresponding to the first hole section 181b. The second opening section 182a opens in a direction perpendicular to the first opening section 181a at one end of the second sleeve section 182 (on the right side in FIG. 11 (c)). As the first opening section 181a and the second opening section 182a are connected to each other, the connection cable 5 can be inserted from one of the first opening section 181a and the second opening section 182a, and passed to the other.

Also, as shown in FIG. 11 (a), the cable sleeve 180 has a slit 183. The slit 183 is cut from the first opening section 181a through the side surface on one of the sides of the first sleeve section 181 to the second opening section 182a. Further, the slit 183 is formed such that its cut width W1 is smaller than the outer diameter of the connection cable 5.

Also, the cable sleeve 180 is made of an elastic member. Accordingly, as shown in FIG. 11 (d), by applying a force in two directions (the up-down direction in FIG. 11 (d)) perpendicular to the cut direction of the slit 183, the cut width W1 of the slit 183 can be opened wider. Also, by releasing the force being applied to the cable sleeve 180 in the state in which the cut width W1 of the slit 183 is opened, the cut width W1 can be returned to the original state due to the elastic force of the cable sleeve 180.

The slit 183 may only require to be cut from the first opening section 181a through the side surface of the first sleeve section 181 on one of the sides thereof to the second opening section 182a, and the cut width W1 does not necessarily require to have a predetermined length.

Next, referring to FIG. 12, a method of holding and fixing the container pipe 3a by the second pipe retaining section 112 will be described.

Figure 12A:
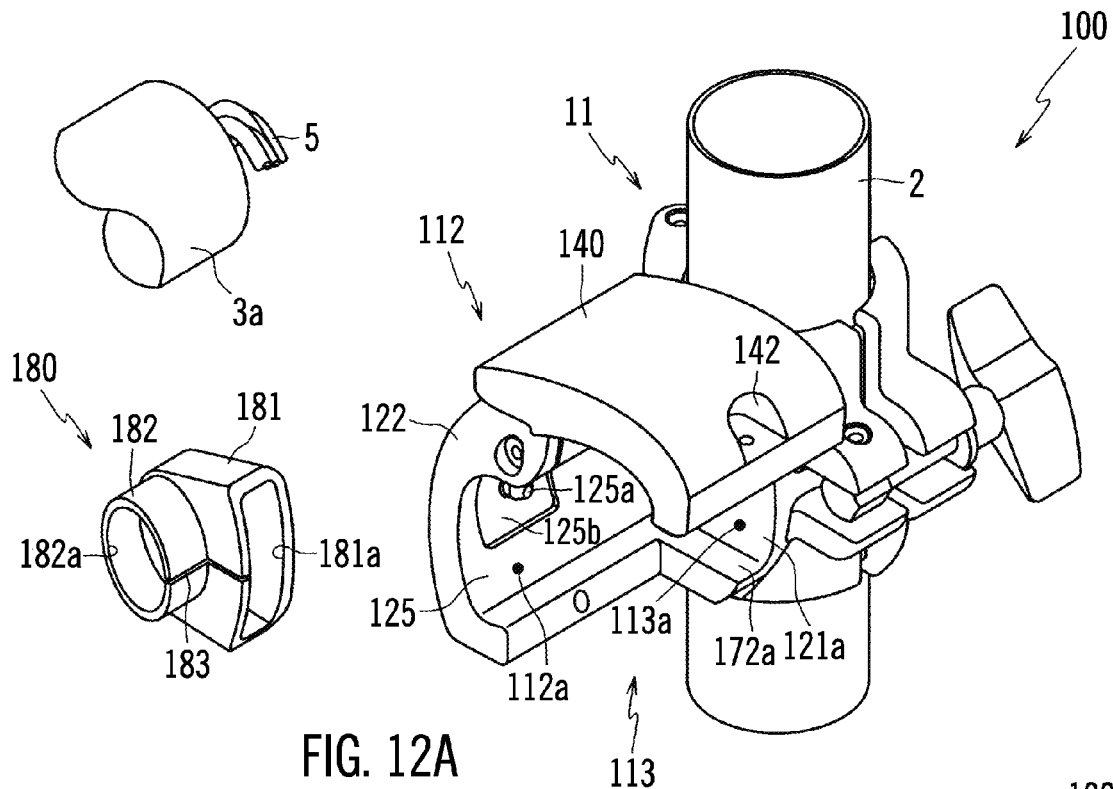
FIG. 12 (a) is an exploded perspective view of the pipe holder and a container pipe in a state in which an upstanding pipe is retained.
Figure 12B:
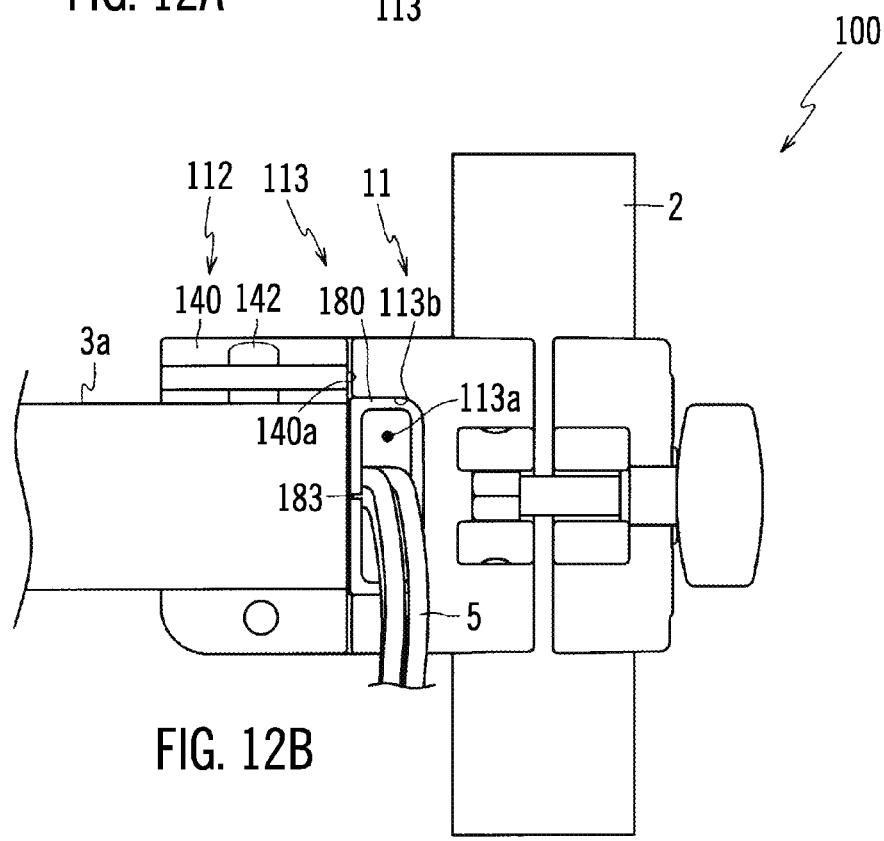

FIG. 12 (a) is an exploded perspective view of the pipe holder 100 and the container pipe 3a in a state in which the upstanding pipe 2 is retained. FIG. 12 (b) is a front view of the container pipe 3a and the pipe holder 100 in a state in which the second part 140 is opened.

As shown in FIG. 12 (a), for holding and fixing the container pipe 3a with the second pipe retaining section 112, first, the connection cable 5 that is contained in the container pipe 3a is contained inside the cable sleeve 180. In this state, the second sleeve section 182 is fitted inside the container pipe 3a on one end side thereof.

If the cable sleeve 180 were not equipped with the slit 183, it would be necessary that one end of the connection cable 5 is inserted in the second opening section 182a and passed through the first opening section 181a, when the connection cable 5 is to be contained inside the cable sleeve 180. Moreover, the connector cable 5 placed inside the cable sleeve 180 needs to be tugged in by a necessary length, at one end of the connector cable 5 passed inside the cable sleeve 180. For this reason, in particular, when the connector cable 5 is long, the work efficiency lowers.

In contrast, in accordance with the described embodiments, the connector cable 5 can be placed at its intermediate portion inside the cable sleeve 180 through the slit 183 while widening the cut width W1 of the slit 183 in the cable sleeve 180 (see FIG. 11 (d)). Accordingly, the work can be efficiently performed irrespective of the length of the connector cable 5 to be guided from the container pipe 3a to the outside.

Further, as shown in FIG. 12 (b), the cut width W1 of the slit 183 is smaller than the outer diameter of the connector cable 5. For this reason, the connector cable 5 contained inside the cable sleeve 180 can be prevented from slipping out through the slit 183. Accordingly, when the cable sleeve 180 is fitted inside the guide opening section 113b, the connector cable 5 contained inside the cable sleeve 180 can be prevented from slipping out through the slit 183 and being damaged by the guide opening section 113b that may come in contact with the connector cable 5.

Also, the cable sleeve 180 has the second sleeve section 182 that can be fitted inside the container pipe 3a. By fitting the second sleeve section 182 inside the container pipe 3a at one end section thereof, the connection cable 5 can be prevented from directly contacting the end section of the container pipe 3a. Therefore, even when the end section of the container pipe 3a has burs or the like, the connection cable 5 can be prevented from being damaged.

Further, when the connector cable 5 is pulled at the time of adjusting the position of the pipe holder 100 for changing the coupled position of the upstanding pipe 2 or the container pipe 3a, a force in a direction different from the direction in which the connector cable 5 is pulled is applied to a portion of the connector cable 5 that is in contact with the guide opening section 113b. The guide opening section 113b is made of metal, such that the connector cable 5 could readily be damaged by the force concentrated on the portion of the connector cable 5 that is in contact with the guide opening section 113b.

In contrast, in accordance with the present embodiments, the connection cable 5 can be guided through the second opening section 182a opened at one end of the second sleeve section 182 into the interior of the cable sleeve 180 and to the first opening section 181a. Therefore, the guide opening section 113b made of metal and the connection cable 5 can be prevented from directly contacting each other. Therefore, the force concentrating on one portion of the connection cable 5 can be reduced, whereby damage to the connection cable 5 can be avoided.

Next, the container pipe 3a fitted with the cable sleeve 180 is fitted to a protrusion 125a provided in a convex shape in the second abutting surface 125. By this, the container pipe 3a can be disposed at an appropriate position. Further, by fitting the container pipe 3a to the protrusion 125a, the container pipe 3a can be retained by the protrusion 125a. By this, the work efficiency in holding and fixing the container pipe 3a by the second pipe retaining section 112 can be improved.

Also, when the container pipe 3a is fitted to the protrusion 125a, the first sleeve section 181 of the cable sleeve 180 that is fitted in the container pipe 3a can be inserted in the guide chamber 113a at the same time. Therefore, the work of fitting the container pipe 3a to the protrusion 125a, and the work for suitably inserting the cable sleeve 180 in the guide chamber 113a can be simultaneously performed. As a result, the work efficiency can be improved accordingly.

Further, when the first sleeve section 181 is inserted in the guide chamber 113a, the tip portion of the pressure-insertion protrusion 61a that protrudes from the first close wall 121a is fitted in the second hole section 181c opened in the other side surface of the cable sleeve 180 (see FIG. 9 (b)). Therefore, the cable sleeve 180 can be disposed at an appropriate position of the guide chamber 113a. Furthermore, the container pipe 3a can be more stably retained by the protrusion 125a.

Lastly, the second part 140 is fastened and fixed to the second fixing section 122 by the fastening member 152. By this, the container pipe 3a can be held and fixed by the second pipe retaining section 112. Also, by tightening and fixing the second part 140 to the second fixing section 122, the second close wall 140a is disposed at a position opposite to the first close wall 121a. By this, the guide opening section 113b that is in a generally rectangular shape in a front view can be formed.

It is noted that the guide opening section 113b is formed in a generally rectangular shape, as viewed from the front, with short-sides extending in the axial direction O3 (in a direction along a line connecting the first pipe retaining section 11 and the second pipe retaining section 112; see FIG. 9 (b)). By this, the distance between the first retaining section 11 and the second retaining section 112 can be made shorter, compared to a case where, for example, the shape of the guide opening section 113b is in a generally circular shape as viewed from the front, or a generally rectangular shape, as viewed from the front, with long-sides extending in the axial direction O3. Therefore, the coupling section 113 can be made smaller. By this, the overall size of the pipe holder 100 can be reduced, and the pipe holder 100 can be made lighter in weight, accordingly.

Moreover, when two pipe holders 100 are brought closer to each other and mounted on the upstanding pipe 2, if the guide opening section 113b opens in a direction along the axial direction O1 (in the longitudinal direction of the first pipe, in the up-down direction in FIG. 12 (b), see FIG. 9 (b)), the connection cable 5 is guided between the two pipe holders 100 that are mounted close to each other. Therefore, when the pipe holder 100 is rotationally moved about the upstanding pipe 2 as an axis, there is a danger that the connection cable 5 may be pinched and snapped off by the two pipe holders 100.

In contrast, in accordance with the present embodiment, the guide opening section 113b opens toward the front side of the pipe holder 100 (in the forward side of FIG. 12 (b)). Accordingly, the danger described above can be avoided.

In this manner, the present embodiment has the coupling section 113 that connects the first pipe retaining section 11 and the second pipe retaining section 112. By this, fixing the upstanding pipe 2 to the first pipe retaining section 11 and releasing them from the fixed state, or fixing the container pipe 3a to the second pipe retaining section 112 and releasing them from the fixed state can be conducted independently from each other.

Therefore, when the coupled position of only one of the upstanding pipe 2 and the container pipe 3a is to be changed, while maintaining the other of the upstanding pipe 2 and the container pipe 3a respectively on the first pipe retaining section 11 and the second pipe retaining section 112 to be fixed, the fixed state of the one of the upstanding pipe 2 and the container pipe 3a respectively on the first pipe retaining section 11 and the second pipe retaining section 112 can be released, whereby the coupled position of only one of the upstanding pipe 2 and the container pipe 3a can be changed. By this, the work efficiency in adjusting the position of the upstanding pipe 2 and the container pipe 3a can be improved.

The guide chamber 113a is formed in the coupling section 113. By this, the coupled position of the upstanding pipe 2 or the container pipe 3a can be adjusted while the connection cable 5 is kept to be contained in the guide chamber 113a. Accordingly, the connection cable 5 does not need to be positioned each time the position of the upstanding pipe 2 or the container pipe 3a is adjusted. Therefore, the work efficiency can be improved.

Furthermore, without regard to fixing the upstanding pipe 2 by the first pipe retaining section 11 and releasing them from the fixed state, and without regard to fixing the container pipe 3a by the second pipe retaining section 112 and releasing them from the fixed state, the volume occupied by the guide chamber 113a can be maintained constant. Therefore, when the upstanding pipe 2 or the container pipe 3a is held and fixed by the first pipe retaining section 11 or the second pipe retaining section 112, respectively, the connection cable 5 can be prevented from being pinched and damaged by the first pipe retaining section 11 or the second pipe retaining section 112.

Next, referring to FIG. 13, a clamp in accordance with a third embodiment will be described. The first embodiment is described as to a case in which the recessed section 23b is formed generally in a central portion of the first abutting surface 23. On the other hand, in the third embodiment, recessed sections 223b are formed on two sides of a first abutting surface 223 in the axial direction O1. It is noted that portions that are the same as those of the first embodiment described above shall be appended with the same reference numbers, and their description shall be omitted.

FIG. 13 (a) is a rear side surface of a first fixing section 221 in accordance with the third embodiment. FIG. 13 (b) is a cross-sectional view of the first fixing section 221 taken along a line XIIIb-XIIIb in FIG. 13 (a). FIG. 13 (c) is a cross-sectional view of the first fixing section 221 when the pipe sleeve 61 is mounted, and is a view corresponding to FIG. 13 (b).

As shown in FIG. 13 (a) and FIG. 13 (b), the first abutting surface 223 has recessed sections 223b. Each of the recessed sections 223b is formed with a constant depth from the first abutting surface 223. Also, each of the recessed sections 223b is in a generally right-angled channel shape in a cross section along the axial direction O1 (in a cross section taken along a line C-C in FIG. 13 (a) and FIG. 13 (b)). Furthermore, the recessed sections 223b are formed on both sides of the first abutting surface 223 in the axial direction O1.

As shown in FIG. 13 (c), the pipe sleeve 6 is fitted as follows. The outer peripheral surface of the pipe sleeve 61 is placed opposite to the first abutting surface 223, and a pressure-insertion protrusion 61a formed in a convex shape protruding from the outer peripheral surface of the pipe sleeve 61 is pushed in a pressure-insertion hole 223c formed in the first abutting surface 223. By this, the pipe sleeve 61 is mounted on the first abutting surface 223.

The pipe sleeve 61 has a curved surface configuration on its outer peripheral surface that conforms to the curved surface configuration of the first abutting surface 223. Therefore, by mounting the pipe sleeve 61 on the first abutting surface 223, the outer peripheral surface of the pipe sleeve 61 comes in contact with the first abutting surface 223. Also, between the first abutting surface 223 and the pipe sleeve 61, there are formed two constant spaces S surrounded by two recessed sections 223b and the outer peripheral surface of the pipe sleeve disposed opposite to the two recessed sections 223b, respectively.

When the outwardly bent portion of the curved pipe 3 is disposed opposite to the recessed section 31b formed in the first fastening surface 31 (see FIG. 7), the outer peripheral surface of the curved pipe 3 on the side of its inwardly bent portion is brought in contact with the inner peripheral surface side of the pipe sleeve 61 in portions on both end sides of the pipe sleeve 61 mounted on the first abutting surface 223 in the longitudinal direction of the curved pipe 3.

Here, the recessed sections 223b are formed on both end sides of the first abutting surface 223 in the axial direction O1 (in the left-right direction in FIG. 13 (a); see FIG. 4). By this, portions of the pipe sleeve 61 whose inner peripheral surface side is in contact with the outer peripheral surface of the curved pipe 3 on its inwardly bent portion side cannot contact the first abutting surface 223 (at both end portions thereof in the longitudinal direction of the curved pipe 3). Therefore the pressure force from the first abutting surface 223 cannot be transmitted thereto.

Therefore, as the first part 30 (see FIG. 7) is pressed against the first fixing section 221, portions of the pipe sleeve 61 where its outer peripheral surface is disposed opposite to the recessed sections 223b are pushed by the inwardly bent portion of the curved pipe 3, thereby being pushed inside the spaces S. Accordingly, even when the pipe sleeve 61 is made of a resin material containing glass fibers which is hard to be deformed, the pipe sleeve 61 can be readily deformed according to the inwardly bent shape of the curved pipe 3. Therefore, a wider contact area can be secured between the pipe sleeve 61 and the curved pipe 3.

Also, when the pipe sleeve 61 is bent according to the shape of the inwardly bent portion of the curved pipe, the first abutting surface 223 contacts the outer peripheral surface of the pipe sleeve 61 at both end sides of a portion among the first abutting surface 223 located between the pair of recessed sections 223b in the axial direction O1 (on the left side and the right side in FIG. 13 (a)).

Therefore, the pressure force caused by pressing the first part 30 toward the first fixing section 221 is transmitted from the surface where the outer peripheral surface of the pipe sleeve 61 is in contact with the first abutting surface 223 (at the both end sides of the portion among the first abutting surface 223 located between the pair of recessed sections 223b in the axial direction O1). Accordingly, the curved pipe 3 can be pushed toward the first fixing section 221.

Next, referring to FIG. 14, a clamp in accordance with a fourth embodiment will be described. The first embodiment has been described as to a case where the recessed sections 23b, 31b are formed in the first abutting surface 23 and the first fastening surface 31, respectively. In accordance with the fourth embodiment, recessed sections 331b are formed on the outer peripheral surfaces of pipe sleeve 362. It is noted that components that are the same as those of the first embodiment described above will be appended with the same reference numbers, and their description will be omitted.

FIG. 14 (a) is a rear side view of a pipe sleeve 362 in accordance with the fourth embodiment. FIG. 14 (b) is a cross-sectional view of the pipe sleeve 362 taken along a line XIVb-XIVb in FIG. 14 (a). FIG. 14 (c) is a rear side view of a first part 330 in a state in which the pipe sleeve 362 is mounted. FIG. 14 (d) is a cross-sectional view of the first part 330 taken along a line XIVd-XIVd in FIG. 14 (c). The first abutting surface has the same configuration as that of the first fastening surface 331, and therefore its description is omitted.

As shown in FIG. 14 (a) and FIG. 14 (b), the pipe sleeve 362 has a recessed section 331b. The recessed section 331b is formed in the outer peripheral surface generally in a central portion thereof with a constant depth from the outer peripheral surface. Also, the recessed section 331b is in a generally right angled channel shape in a side cross-sectional view (in a cross-sectional view taken along a line D-D of FIG. 14 (a) and FIG. 14 (b)).

As shown in FIG. 14 (c) and FIG. 14 (d), the first fastening surface 331 is formed in an arc shape with a smooth concave surface, and has protruded walls 331a and a pressure-insertion hole 331c.

The pipe sleeve 362 is formed in a manner that its outer peripheral surface has a curved surface configuration that conforms to the curved surface configuration of the first fastening surface 331. Therefore, by attaching the pipe sleeve 362 to the first fastening surface 331, the outer peripheral surface of the pipe sleeve 362 and the first fastening surface 331 are brought in contact with each other. Also, between the first fastening surface 331 and the pipe sleeve 362, a constant space S surrounded by the recessed section 331b formed in the outer peripheral surface of the pipe sleeve 362 and the first fastening surface 331 disposed opposite to the recessed section 331b is formed.

The recessed section 331b is formed in the outer peripheral surface of the pipe sleeve 362. Therefore, when the curved pipe 3 is retained by disposing the outwardly bent portion of the curved pipe 3 in a manner to face the recessed section 331b formed in the pipe sleeve 362 (see FIG. 7), the pipe sleeve 361 that is in contact with the outer peripheral surface of the curved pipe 3 on its outwardly bent portion side cannot contact the first fastening surface 331 in a portion thereof (a central portion of the curved pipe 3 in the longitudinal direction). For this reason, the pressure force from the first fastening surface 331 cannot be transmitted.

Accordingly, as the first part 330 is pressed against the first fixing section 321, the portion of the pipe sleeve 362 where the recessed section 331b is formed in its outer peripheral surface is pushed by the outwardly bent portion of the curved pipe 3, thereby being pushed inside the space S. Accordingly, even when the pipe sleeve 362 is made of a resin material containing glass fibers which is normally hard to be deformed, the pipe sleeve 362 can be readily deformed according to the outwardly bent shape of the curved pipe 3. Therefore, a wider contact area can be secured between the pipe sleeve 362 and the curved pipe 3.

The invention has been described above based on each of the embodiments, but the invention is not limited to the embodiments described above, and it can be readily understood that many improvements and modifications can be made within the range that does not depart from the subject matter of the invention.

For example, in each of the embodiments described above, the recessed sections (23b, 31b 223b, 331b) are formed in both of the first abutting surface (23, 223) and the first fastening surface (31, 331). However, without being limited to the above, the recessed section (23b, 31b 223b, 331b) may be formed in either the first abutting surface (23, 223) or the first fastening surface (31, 331). In this way, the manufacturing cost for the clamp 10 or the pipe holder 100 can be reduced.

Also, in the first embodiment through the third embodiment described above, the recessed section (23b, 31b, 223b) is formed in a uniform depth from the first abutting surface (23, 223) or from the first fastening surface 31, and has a generally right angled channel shape in a cross-sectional view along the axial direction O1. However, the invention may not necessarily be limited to the above. The recessed section (23b, 31b, 223b) may be formed in a generally arc shape or a tapered shape in a cross-sectional view along the axial direction O1. If the recessed section (23b, 31b, 223b) is provided in a concaved generally arc shape in a cross-sectional view along the axial direction O1, and when the curved pipe 3 to be retained by the recessed section (23b, 31b, 223b) is set to have a predetermined radius R, a wider contact area can be secured between the curved pipe 3 and the inner peripheral surface of the pipe sleeve 61 or 62 by matching the radius R of the curved pipe 3 with the recessed section (23b, 31b, 223b).

Furthermore, in each of the embodiments described above, the first abutting surface (23, 223) and the first fastening surface (31, 331) is described as having a pair of protruded walls (23a, 31, 223a, 331a) that are provided in a protruded shape continuously in a circumferential direction on both ends thereof in the axial direction O1. However, the invention is not necessarily limited to the above. Both ends of the abutting surface (23, 223) and the first fastening surface (31, 331) in the axial direction O1 may be formed in a flat surface. By this, the manufacturing cost for the clamps 10 or the pipe holder 100 can be reduced.

Also, in each of the embodiments described above, when the recessed section (23b, 31b, 223b, and 331b) is viewed in the axial direction O1, the outer peripheral surface of the pipe sleeve (61, 62, 361, 362) and the first fastening surface (31, 331) are described as being in contact with each other on both sides of the recessed section (23b, 31b, 223b, 331b) in the first abutting surface (23, 223) or the first fastening surface (31, 331) in their circumferential direction. However, the invention is not necessarily limited to the above. As viewed in the axial direction O1, the recessed section (23b, 31b, 223b, 331b) may be formed entirely along the circumferential direction of the first abutting surface (23, 223, 232) or the first fastening surface (31, 331). By this, when the arrangement of musical instruments is changed according to the preference of a performer, and the clamps 10 are rotationally moved about the curved pipe 3 as an axis, the outwardly bent portion of the curved pipe 3 can be disposed opposite to the recessed section (23b, 31b, 223b, 331b). Therefore, the arrangement positions of the musical instruments can be freely changed while keeping the state in which the curved pipes 3 can be reliably fixed with the clamps 10.

In the second embodiment described above, while keeping the connection cable 5 contained in the container pipe 3a being contained in the cable sleeve 180, and keeping the state in which the second sleeve section 182 is fitted inside one end side of the container pipe 3a, the container pipe 3a is held and fixed by the second pipe retaining section 112, whereby the connection cable 5 and the cable sleeve 180 are inserted in the guide chamber 113a. However, the invention is not necessarily limited to the above. The container pipe 3a may be directly held and fixed by the second pipe retaining section 112, and the connection cable 5, while being contained inside the guide chamber 113a, may be guided externally through the guide opening section 113b. By this, the cable sleeve 180 may be made unnecessary. Accordingly, the manufacturing cost can be reduced, and the work for inserting the cable sleeve 180 can be made unnecessary. Therefore the work efficiency can be improved.

Also, in the second embodiment described above, the description is made as to the case where the cable sleeve 180 has the first sleeve section 181 and the second sleeve section 182, and the connection cable 5 is inserted in one of the first opening section 181a and the second opening section 182a that opens at one end of the second sleeve section 182 and passed through the other. However, the invention is not necessarily limited to the above. The cable sleeve 180 may be equipped with the first sleeve section 181, and the connection cable 5 may be inserted in one of the first opening section 181a and the first hole section 181 formed in the side surface of the first sleeve section 181 on one side thereof and passed through the other. By this, the second sleeve section 182 may be made unnecessary. Accordingly, the manufacturing cost for the cable sleeve 180 can be reduced.

In the second embodiment described above, the description is made as to the case where the cable sleeve 180 has the slit 183 that is cut from the first opening section 181a through the side surface of the first sleeve section 181 on one of the sides thereof to the second opening section 182a. However, the invention is not necessarily limited to the above. It may be sufficient if the slit 183 is cut from the first opening section 181a to the second opening section 182a. For example, the slit may be cut from the first opening section 181a through the side surface of the first sleeve section 181 on the other side to the second opening section 182a.

Also, in accordance with the second embodiment described above, the description is made as to the case where the cable sleeve 180 has the slit 183. However, the invention is not necessarily limited to the above. The slit 183 may not be provided. By this, the manufacturing cost for the cable sleeve 180 can be reduced.

Furthermore, in the second embodiment described above, the description is made as to the case where the guide opening section 113b is in a generally rectangular shape having short-sides in the axial direction O3 as viewed from the front. However, the invention is not necessarily limited to the above. The guide opening section 113b may be in a generally circular shape or a generally rectangular shape having long-sides in the axial direction O3 as viewed from the front. By this, the opening area of the guide opening section 113b can be secured. Accordingly, more connection cables 5 contained in the container pipe 3a can be guided. Furthermore, when a plurality of connection cables 5 are passed through the guide opening section 113b, the connection cables 5 can be prevented from being compressed and damaged.

The invention claimed is:

1. A clamp for a musical instrument stand to hold a pipe, comprising:
   a pipe retaining section having a base section formed with an abutting surface and a fastening section formed with a fastening surface that is opposite to the abutting surface of the base section to retain the pipe;
   a pipe sleeve having an outer peripheral surface adapted to contact the abutting surface at an abutting side of the outer peripheral surface of the pipe sleeve and adapted to contact the fastening surface at a fastening side of the outer peripheral surface of the pipe sleeve; and a recessed section defining a space formed in a portion of at least one of the outer peripheral surface of the pipe sleeve, the fastening surface, and the abutting surface, wherein when the recessed section is formed in the abutting surface, the abutting surface is adapted to contact a first side and a second side of the abutting side of the outer peripheral surface of the pipe sleeve, wherein the recessed section is interposed between the first and the second sides of the abutting side of the outer peripheral surface in a direction along a line extending between centers of openings at ends of the pipe retaining section, wherein when the recessed section is formed in the fastening surface, the fastening surface is adapted to contact a first side and a second side of the fastening side of the outer peripheral surface of the pipe sleeve, wherein the recessed section is interposed between the first and the second sides of the fastening side of the outer peripheral surface in a direction along a line extending between centers of openings at ends of the pipe retaining section, wherein when the recessed section is formed in the abutting side of the outer peripheral surface of the pipe sleeve, the abutting surface is adapted to contact a first side and a second side of the abutting side of the outer peripheral surface of the pipe sleeve, wherein the recessed section is interposed between the first and the second sides of the abutting side of the outer peripheral surface in a direction along a line extending between centers of openings at ends of the pipe retaining section, and wherein when the recessed section is formed in the fastening side of the outer peripheral surface of the pipe sleeve, the fastening surface is adapted to contact a first side and a second side of the fastening side of the outer peripheral surface of the pipe sleeve, wherein the recessed section is interposed between the first and the second sides of the fastening side of the outer peripheral surface in a direction along a line extending between centers of openings at ends of the pipe retaining section.

2. The clamp of claim 1, further comprising:
protruded walls that are located at openings on both sides of the pipe retaining section and protrude on the abutting surface and the fastening surface, wherein the protruded walls are formed with tips being lower than an inner peripheral surface of the pipe sleeve.

3. The clamp of claim 1, wherein the recessed section has a concave shape.

4. The clamp of claim 1, wherein the outer peripheral surface of the pipe sleeve, the abutting surface or the fastening surface, which has the recessed section formed therein, is in contact in part with a mutually opposing one of the outer peripheral surface of the pipe sleeve, the abutting surface and the fastening surface as viewed in a cross section that is perpendicular to a line connecting between a center of openings of the pipe retaining section and includes the recessed section.

5. The clamp of claim 1, wherein the recessed section is formed in a constant depth having a concave shape, and has a cross section that is in a generally right-angled channel shape along a line connecting between a center of openings of the pipe retaining section.

6. The clamp of claim 1, wherein the recessed section is formed at two places in one of the abutting surface and the outer peripheral surface of the pipe sleeve that is opposite to the abutting surface, and in one of the fastening surface and the outer peripheral surface of the pipe sleeve that is opposite to the fastening surface.

7. The clamp of claim 1, wherein the outer peripheral surface of the pipe sleeve comprises a flat arcuate protruded surface shape.

8. The clamp of claim 1, further comprising a bolt member for tightening the fastening section to the base section, wherein the recessed section opens in the same direction as or in a direction opposite to an axial direction of the bolt member at the time of tightening and fixing the fastening section to the base section.

9. The clamp of claim 1, wherein the pipe sleeve is made of a resin material having a Young's modulus of 0.5 GPa or higher but less than 10 GPa.

10. A clamp for a musical instrument stand to hold a pipe, comprising:
a pipe retaining section having a base section formed with an abutting surface and a fastening section formed with a fastening surface that is opposite to the abutting surface of the base section;
a pipe sleeve having an outer peripheral surface adapted to contact the abutting surface at an abutting side of the outer peripheral surface of the pipe sleeve; and
a recessed section in a portion of the abutting surface defining a predetermined space between the abutting surface and the abutting side opposite to the abutting surface.

11. The clamp of claim 10, wherein the recessed section comprises a first recessed section, further comprising:
a second recessed section having a concave shape in a portion of the outer peripheral surface of the pipe sleeve opposite to the fastening surface or in a portion of the fastening surface.

12. The clamp of claim 10, wherein the abutting surface is in contact with first and second sides of the abutting side of the outer peripheral surface of the pipe sleeve as viewed in a cross section that is perpendicular to a line extending between centers of openings at ends of the pipe retaining section and includes the recessed section.

13. A clamp for a musical instrument stand to hold a pipe, comprising:
a pipe retaining section having a metal base section formed with an abutting surface having a cylindrical inner peripheral surface and a metal fastening section formed with a fastening surface having a cylindrical inner peripheral surface that is opposite to the abutting surface of the base section, wherein the abutting surface and the fastening surface hold an outer peripheral surface of the pipe from one side and another side to retain the pipe;
a pipe sleeve in a semi-cylindrical shape that is made of a resin material, and has an outer peripheral surface to be abutted to the abutting surface or the fastening surface so as to be mounted on the abutting surface or the fastening surface; and
a recessed section that is provided in a concave shape in a portion of an outer peripheral surface of the pipe sleeve or the abutting surface;
wherein a predetermined space surrounded by the recessed section and a surface opposite to the recessed section is formed between the abutting surface and the outer peripheral surface of the pipe sleeve opposite to the abutting surface, and wherein the abutting surface includes a pressure insertion hole into which a pressure insertion protrusion on the pipe sleeve is fitted.

14. A clamp for a musical instrument stand to hold a pipe, comprising:
a pipe retaining section having a base section formed with an abutting surface and a fastening section formed with a fastening surface having a cylindrical inner peripheral surface that is opposite to the abutting surface of the base section, wherein the abutting surface and the fastening surface hold an outer peripheral surface of the pipe from one side and another side to retain the pipe;

a pipe sleeve having an outer peripheral surface adapted to contact the fastening surface at a fastening side of the outer peripheral surface of the pipe sleeve; and a recessed section defining a space formed in a portion of the fastening surface wherein the fastening surface is adapted to contact a first side and a second side of the fastening side of the outer peripheral surface of the pipe sleeve, wherein the recessed section is interposed between the first and the second sides of the fastening side of the outer peripheral surface in a direction along a line extending between centers of openings at ends of the pipe retaining section.

15. The clamp of claim 14, wherein the recessed section comprises a first recessed section, further comprising:

a second recessed section having a concave shape in a portion of the outer peripheral surface of the pipe sleeve opposite to the abutting surface or in a portion of the abutting surface.

16. The clamp of claim 14, wherein the outer peripheral surface of the pipe sleeve and the fastening surface, which has the recessed section provided in a concave shape therein, is in contact in part with a mutually opposing one of the outer peripheral surface of the pipe sleeve and the fastening surface as viewed in a cross section that is perpendicular to a line connecting between a center of the opening of the one end side and a center of the opening of the other end side of the pipe retaining section and includes the recessed section.

17. A clamp for a musical instrument stand to hold a pipe, comprising:

a pipe retaining section having a metal base section formed with an abutting surface having a cylindrical inner peripheral surface and a metal fastening section formed with a fastening surface having a cylindrical inner peripheral surface that is opposite to the abutting surface of the base section, wherein the abutting surface and the fastening surface hold an outer peripheral surface of the pipe from one side and another side to retain the pipe;

a pipe sleeve in a semi-cylindrical shape that is made of a resin material, and has an outer peripheral surface to be abutted to the abutting surface or the fastening surface so as to be mounted on the abutting surface or the fastening surface; and a recessed section that is provided in a concave shape in a portion of an outer peripheral surface of the pipe sleeve and the fastening surface;

wherein a predetermined space surrounded by the recessed section and a surface opposite to the recessed section is formed between the fastening surface and the outer peripheral surface of the pipe sleeve opposite to the fastening surface, wherein the fastening surface includes a pressure insertion hole into which a pressure insertion protrusion on the pipe sleeve is fitted.

18. The clamp of claim 1, wherein the portion in which the recessed section is provided comprises a cylindrical surface.

19. The clamp of claim 10, wherein the portion in which the recessed section is provided comprises a cylindrical surface.

20. The clamp of claim 14, wherein the portion in which the recessed section is provided comprises a cylindrical surface.

21. The clamp of claim 10, further comprising:

protruded walls that are located at openings on both sides of the pipe retaining section and protrude on the abutting surface and the fastening surface, wherein the protruded walls are formed with tips being lower than an inner peripheral surface of the pipe sleeve.

22. The clamp of claim 14, further comprising:

protruded walls that are located at openings on both sides of the pipe retaining section and protrude on the abutting surface and the fastening surface, wherein the protruded walls are formed with tips being lower than an inner peripheral surface of the pipe sleeve.

23. A clamp for a musical instrument stand to hold a pipe, comprising:

a pipe retaining section having a base section formed with an abutting surface and a fastening section formed with a fastening surface that is opposite to the abutting surface of the base section;

a pipe sleeve having an outer peripheral surface adapted to abut the abutting surface at an abutting side of the outer peripheral surface and adapted to abut the fastening surface at a fastening side of the outer peripheral surface; and a recessed section defining a shape substantially comprising one of a rectangular shape, a rhombus shape and an oval shape in a portion of at least one of the outer peripheral surface of the pipe sleeve, the abutting surface and the fastening surface, wherein a predetermined space surrounded by the recessed section and a surface opposite to the recessed section is formed between the abutting surface and the outer peripheral surface of the pipe sleeve opposite to the abutting surface or between the fastening surface and the outer peripheral surface of the pipe sleeve opposite to the fastening surface, wherein when the recessed section is formed in the abutting surface, the abutting surface is adapted to contact a first side and a second side of the abutting side of the outer peripheral surface of the pipe sleeve, wherein the recessed section is interposed between the first and the second sides of the abutting side of the outer peripheral surface in a direction along a line extending between centers of openings at ends of the pipe retaining section, wherein when the recessed section is formed in the fastening surface, the fastening surface is adapted to contact a first side and a second side of the fastening side of the outer peripheral surface of the pipe sleeve, wherein the recessed section is interposed between the first and the second sides of the fastening side of the outer peripheral surface in a direction along a line extending between centers of openings at ends of the pipe retaining section, wherein when the recessed section is formed in the abutting side of the outer peripheral surface of the pipe sleeve, the abutting surface is adapted to contact a first side and a second side of the abutting side of the outer peripheral surface of the pipe sleeve, wherein the recessed section is interposed between the first and the second sides of the abutting side of the outer peripheral surface in a direction along a line extending between centers of openings at ends of the pipe retaining section, and wherein when the recessed section is formed in the fastening side of the outer peripheral surface of the pipe sleeve, the fastening surface is adapted to contact a first side and a second side of the fastening side of the outer peripheral surface of the pipe sleeve, wherein the recessed section is interposed between the first and the second sides of the fastening side of the outer peripheral surface in a direction along a line extending between centers of openings at ends of the pipe retaining section.

* * * * *